(12) United States Patent
Wang

(10) Patent No.: US 12,519,959 B2
(45) Date of Patent: Jan. 6, 2026

(54) MULTIMEDIA DATA PROCESSING METHOD AND APPARATUS, COMPUTER DEVICE, COMPUTER-READABLE STORAGE MEDIUM, AND COMPUTER PROGRAM PRODUCT

(71) Applicant: Tencent Technology (Shenzhen) Company Limited, Guangdong (CN)

(72) Inventor: Yingbin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 118 days.

(21) Appl. No.: 18/502,733

(22) Filed: Nov. 6, 2023

(65) Prior Publication Data
US 2024/0155137 A1    May 9, 2024

Related U.S. Application Data

(63) Continuation of application No. PCT/CN2022/118492, filed on Sep. 13, 2022.

(30) Foreign Application Priority Data

Oct. 20, 2021 (CN) .......................... 202111221892.4

(51) Int. Cl.
H04N 19/176   (2014.01)
G06V 10/75    (2022.01)
H04N 19/159   (2014.01)

(52) U.S. Cl.
CPC ......... *H04N 19/176* (2014.11); *G06V 10/751* (2022.01); *H04N 19/159* (2014.11)

(58) Field of Classification Search
None
See application file for complete search history.

(56) References Cited

U.S. PATENT DOCUMENTS 10,516,882 B2 * 12/2019 He .................. H04N 19/197
10,798,376 B2 * 10/2020 Xu .................. H04N 19/70
(Continued)

FOREIGN PATENT DOCUMENTS

CN    108141605 A    6/2018
CN    110730354 A    1/2020
(Continued)

OTHER PUBLICATIONS

Yingbin Wang et al., "Low Complexity Implementation of Intra String AVS3", International Conference on Multimedia & Expo Workshops, 2021, No. 978-1-6654-4989, pp. 1-4 (4 pages total).
(Continued)

*Primary Examiner* — Mohammad J Rahman
(74) *Attorney, Agent, or Firm* — Sughrue Mion, PLLC

(57) ABSTRACT

Example embodiments provide a multimedia data processing method and apparatus, a computer device, a computer-readable storage medium, and a computer program product. The method includes: obtaining a global reference data block set and a local reference data block set, the global reference data block set and the local reference data block set being associated with a first data block in a multimedia data frame, the global reference data block set including a coded data block having no adjacent relationship with the first data block in the multimedia data frame, and the local reference data block set including a coded data block having an adjacent relationship with the first data block in the multimedia data frame; and determining a reference data block for coding or decoding of the first data block from the global reference data block set and the local reference data block set.

20 Claims, 12 Drawing Sheets

(56) References Cited

U.S. PATENT DOCUMENTS

| | | | |
|---|---|---|---|
| 10,812,822 B2 * | 10/2020 | Rapaka | H04N 19/523 |
| 11,070,847 B2 * | 7/2021 | Zhang | H04N 19/159 |
| 11,653,019 B2 * | 5/2023 | Lin | H04N 19/105 |
| | | | 375/240.16 |
| 2017/0238001 A1 * | 8/2017 | Li | H04N 19/593 |
| 2018/0007359 A1 * | 1/2018 | Hsiang | H04N 19/91 |
| 2018/0014011 A1 * | 1/2018 | He | H04N 19/593 |
| 2018/0302640 A1 * | 10/2018 | Li | H04N 19/58 |
| 2019/0174145 A1 * | 6/2019 | Zhang | H04N 19/11 |
| 2019/0208217 A1 * | 7/2019 | Zhou | H04N 19/139 |
| 2020/0029072 A1 * | 1/2020 | Xu | H04N 19/105 |
| 2021/0037250 A1 * | 2/2021 | Makar | H04N 19/107 |
| 2022/0014777 A1 * | 1/2022 | Lin | H04N 19/44 |

FOREIGN PATENT DOCUMENTS

| | | |
|---|---|---|
| CN | 111373756 A | 7/2020 |
| CN | 113365080 A | 9/2021 |
| EP | 4 395 312 A1 | 7/2024 |
| JP | 2021-093635 A | 6/2021 |

OTHER PUBLICATIONS

Wei Xiao et al., "Weighted Rate-Distortion Optimization for Screen Content Coding", Transactions on Circuits and Systems for Video Technology, 2018, vol. 28, No. 2, pp. 499-512 (14 pages total).

Xiaozhong Xu et al., "Overview of Screen Content Coding in Recently Developed Video Coding Standards", Transactions on Circuits and Systems for Video Technology, 2022, vol. 32, No. 2, pp. 839-852 (14 pages total).

International Search Report of PCT/CN2022/118492 dated Dec. 2, 2022 [PCT/ISA/210].

Written Opinion of PCT/CN2022/118492 dated Dec. 2, 2022 [PCT/ISA/237].

Communication issued May 29, 2025 in Chinese Application No. 202111221892.4.

* cited by examiner

MULTIMEDIA DATA PROCESSING METHOD AND APPARATUS, COMPUTER DEVICE, COMPUTER-READABLE STORAGE MEDIUM, AND COMPUTER PROGRAM PRODUCT

CROSS-REFERENCES TO RELATED APPLICATIONS

This application is a continuation of International Application No. PCT/CN2022/118492, filed on Sep. 13, 2022, which claims priority to Chinese Patent Application No. 202111221892.4, filed on Oct. 20, 2021, in the China National Intellectual Property Administration, the disclosure of which are incorporated by reference in their entirety.

FIELD

The present disclosure relates to the field of Internet technologies, and in particular to a multimedia data processing method and apparatus, a computer device, a computer-readable storage medium, and a computer program product.

BACKGROUND

During multimedia data processing, an intra (picture) prediction coding mode is usually used for predictive coding of multimedia data frames, which may improve the coding performance of multimedia data frames. Therefore, the intra (picture) prediction coding mode has been widely used in multimedia data processing. However, in practice, it is found that in the existing intra (picture) prediction coding mode, the coding performance of multimedia data frames is poor due to limited reference data blocks for predictive coding.

SUMMARY

Embodiments of the present disclosure provide a multimedia data processing method and apparatus, a computer device, a computer-readable storage medium, and a computer program product, which may improve the coding performance of multimedia data frames.

An embodiment of the present disclosure provides a multimedia data processing method, including:
obtaining a global reference data block set and a local reference data block set, wherein the global reference data block set and the local reference data block set are associated with a first data block in a multimedia data frame, wherein the global reference data block set comprises a first coded data block being non-adjacent to the first data block, and wherein the local reference data block set comprises a second coded data block being adjacent to the first data block; and
determining a reference data block for predictive coding of the first data block based on the global reference data block set and the local reference data block set.

An embodiment of the present disclosure provides a multimedia data processing method, including:
obtaining a global reference data block set and a local reference data block set, wherein the global reference data block set and the local reference data block set are associated with a first data block in a multimedia data frame, wherein the global reference data block set comprises a first decoded data block being non-adjacent to the first data block, and wherein the local reference data block set comprises a second decoded data block being adjacent to the first data block; and
determining a reference data block for predictive decoding of the first data block based on the global reference data block set and the local reference data block set.

An embodiment of the present disclosure provides a multimedia data processing apparatus, including:
first obtaining code configured to cause the at least one processor to obtain a global reference data block set and a local reference data block set, wherein the global reference data block set and the local reference data block set are associated with a first data block in a multimedia data frame, wherein the global reference data block set comprises a first coded data block being non-adjacent to the first data block, and wherein the local reference data block set comprises a second coded data block being adjacent to the first data block; and
first determining code configured to cause the at least one processor to determine a reference data block for predictive coding of the first data block based on the global reference data block set and the local reference data block set.

An embodiment of the present disclosure provides a multimedia data processing apparatus, including:
first obtaining code configured to cause the at least one processor to obtain a global reference data block set and a local reference data block set, wherein the global reference data block set and the local reference data block set are associated with a first data block in a multimedia data frame, wherein the global reference data block set comprises a first decoded data block being non-adjacent to the first data block, and wherein the local reference data block set comprises a second decoded data block being adjacent to the first data block; and
first determining code configured to cause the at least one processor to determine a reference data block for predictive decoding of the first data block based on the global reference data block set and the local reference data block set.

An embodiment of the present disclosure provides a computer device, including: a processor and a memory, where the memory is configured to store a computer program, and the processor is configured to invoke the computer program to perform the steps in the foregoing methods.

An embodiment of the present disclosure provides a computer-readable storage medium. The computer-readable storage medium stores a computer program, the computer program includes program instructions, and the program instructions, when executed by a processor, perform the steps in the foregoing methods.

An embodiment of the present disclosure provides a computer program product, including a computer program or program instructions, where the computer program or program instructions, when executed by a processor, may implement the steps in the foregoing methods.

Through the embodiments of the present disclosure, the global reference data block set and the local reference data block set may be obtained, which is beneficial for a terminal performing coding processing to adaptively select a reference data block from the global reference data block set and the local reference data block set according to application scenes or user requirements, so as to perform predictive coding of the data block to be coded in the multimedia data frame according to the reference data block. As a result, the selection scope of reference data blocks is extended, and the coding performance of multimedia data frames may be improved.

BRIEF DESCRIPTION OF THE DRAWINGS

To describe the technical solutions in the embodiments of the present disclosure or in the related art more clearly, the following briefly introduces the accompanying drawings for describing the embodiments or the related art. Apparently, the accompanying drawings in the following description show merely some embodiments of the present disclosure, and a person of ordinary skill in the art may still obtain other accompanying drawings according to these accompanying drawings without creative efforts.

DETAILED DESCRIPTION

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

Figure 1:
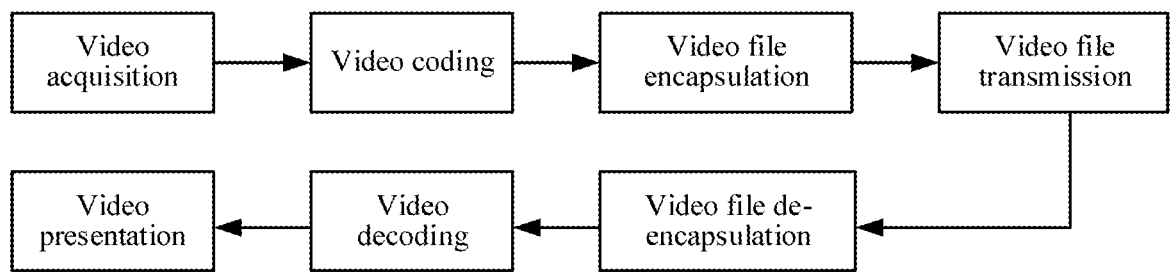
FIG. 1 is a flow diagram of video processing provided in an embodiment of the present disclosure.

The embodiments of the present disclosure relate to the processing technology of multimedia data. The multimedia data (or called media data) refers to composite data formed by media data such as texts, graphics, images, voices, animations and moving images that are related to each other in content. The multimedia data mentioned in the embodiments of the present disclosure mainly includes image data composed of images, or video data composed of images, voices, and the like. In the embodiments of the present disclosure, the data processing procedure of the multimedia data is described in detail mainly by taking the multimedia data as video data. When the multimedia data is image data, refer to the embodiments of the present disclosure. The processing procedure of the multimedia data involved in the embodiments of the present disclosure mainly includes media data acquisition, media data coding, media data file encapsulation, media data file transmission, media data decoding and final data presentation. When the multimedia data is video data, the complete processing procedure for the video data may be shown in FIG. 1, specifically including: video acquisition, video coding, video file encapsulation, video transmission, video file de-encapsulation, video decoding and final video presentation.

Figure 2:
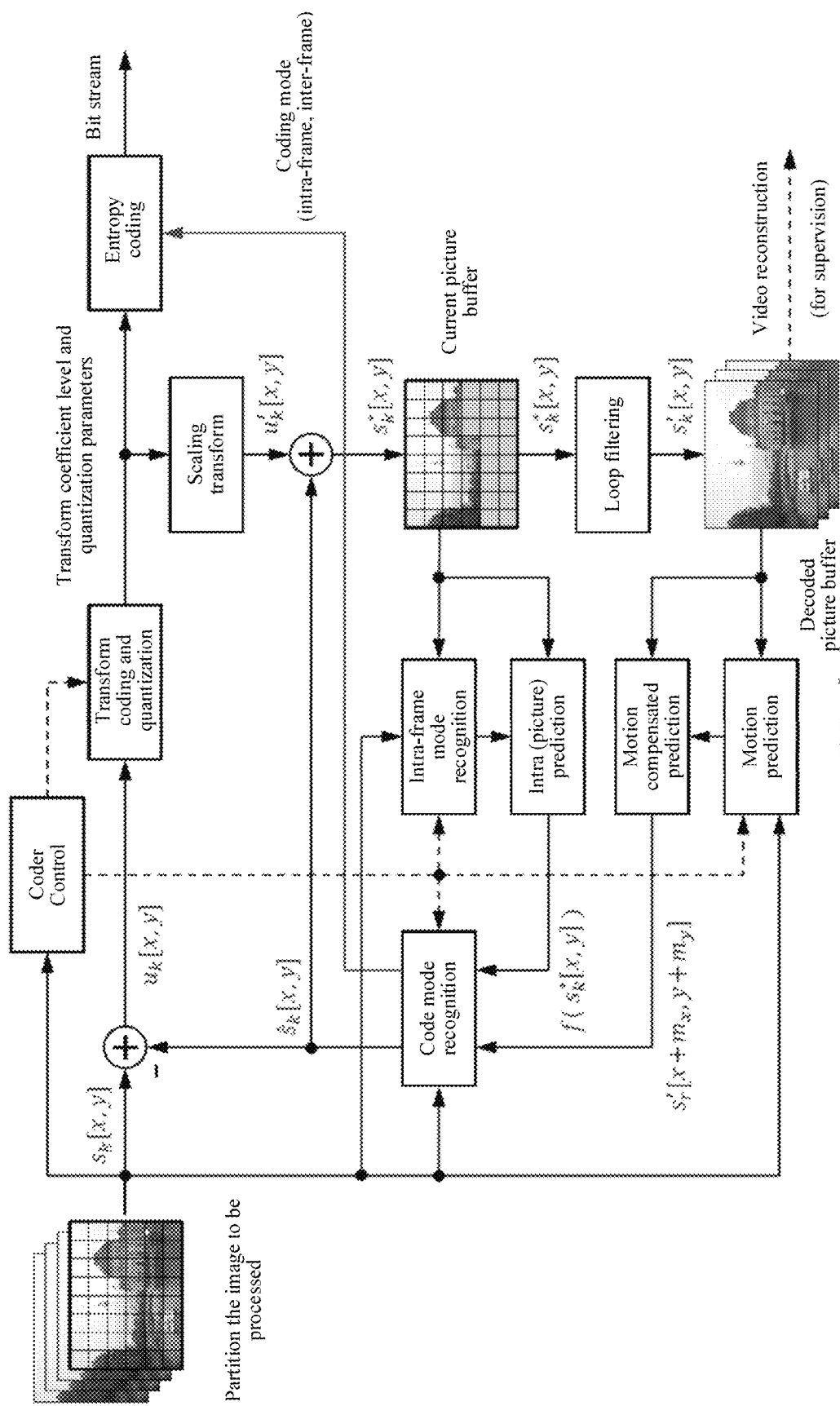
FIG. 2 is a schematic flow diagram of a processing method for multimedia data provided in an embodiment of the present disclosure.

The video acquisition is used for converting an analog video into a digital video and saving the digital video in a format of a digital video file. In other words, the video acquisition may convert a video signal into binary digital information, where the binary information converted from the video signal is a binary data stream, and the binary information may also be called a code stream or bitstream of the video signal. Video coding refers to the conversion of a file in an original video format into a file in another video format through a compression technology. The video media contents mentioned in the embodiments of the present disclosure include real scenes generated by video camera acquisition and screen content scenes generated by a computer. From the perspective of the mode of obtaining video signals, video signals may be shot by a video camera or generated by a computer. Due to different statistical characteristics, corresponding compression coding modes may also be different. In the embodiments of the present disclosure, a hybrid coding framework is used for performing a series of the following operations and processing on an inputted original video signal, as shown in FIG. 2.

Figure 3:
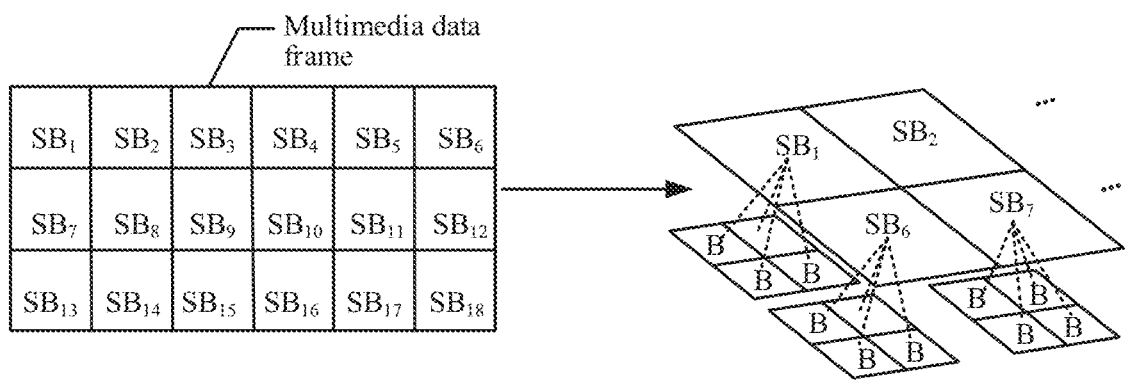
FIG. 3 is a schematic diagram of coded data blocks provided in an embodiment of the present disclosure.

1. Block partition structure: A multimedia data frame (such as a video frame in video data) is inputted, the multimedia data frame is partitioned into multiple non-overlapping processing units according to the size of a block, and each processing unit performs a similar compression operation. In some embodiments, this processing unit is called a coding tree unit (CTU) or a largest coding unit (LCU). The CTU may be more finely partitioned to obtain at least one basic coding unit which is called a coding unit (CU). Each CU is a most basic element in a coding process. In some embodiments, this processing unit may also be called a tile (a rectangular region of a multimedia data frame for decoding and coding independently). The tile may be more finely partitioned to obtain at least one superblock (SB), the SB is a starting point of block partition and may be further partitioned into multiple sub-blocks, and then, the SB is partitioned to obtain at least one data block (B). Each data block is a most basic element in a coding process. The following describes various coding modes that may be used for each data block, where the relationship between the SB and the B may be shown in FIG. 3.

2. Predictive coding: includes an intra (picture) prediction mode and an inter (picture) prediction mode. After an original video signal is predicted by a selected reconstructed video signal, a residual video signal is obtained. In many possible predictive coding modes, a coding side needs to determine the most suitable predictive coding mode for the current coded data block (that is, the data block to be coded), and inform a decoding side.

a. (Intra (picture) prediction): Predicted signals come from regions that have been coded and reconstructed in a same image.

b. (Inter (picture) prediction): Predicted signals come from other images (called reference images) that have been coded and are different from the current image.

3. (Transform & Quantization): After discrete Fourier transform (DFT), discrete cosine transform (DCT) (a subset of DFT) and other transform operations, a residual video signal is converted into a transform domain, which is called a transform coefficient. A lossy quantization operation is performed on the signal in the transform domain, and certain information is lost, so that the quantized signal is beneficial to compression expression.

In some video coding standards, there may be many transform modes for selection, therefore, the coding side also needs to select a transform mode for the current coded data block, and inform the decoding side. The fineness of quantization is usually determined by a quantization parameter (QP). When the value of the QP is larger, it indicates that coefficients with a larger value range will be quantized into the same output, which will usually bring a larger distortion and a lower code rate. On the contrary, when the value of the QP is smaller, it indicates that coefficients with a smaller value range will be quantized into the same output, which will usually bring a smaller distortion and a higher code rate.

4. Entropy coding or statistical coding: The quantized transform domain signal will be statistically compressed and coded according to the frequency of occurrence of each value, and finally, a binary (0 or 1) compressed code stream will be outputted. Furthermore, for other information generated by coding, such as a selected mode and a motion vector, the entropy coding is also required for reducing the code rate.

The statistical coding is a lossless coding mode which may effectively reduce the code rate required for expressing a same signal. Common statistical coding modes include variable length coding (VLC) or content adaptive binary arithmetic coding (CABAC).

5. Loop filtering: After the operations of inverse quantization, inverse transform and predictive compensation (reverse operations of the foregoing ② to ④) on the coded image (that is, the multimedia data frame), a reconstructed decoded image may be obtained. Compared with an original image, some information of the reconstructed image is different from that of the original image due to the influence of quantization, resulting in distortion. The reconstructed image is subjected to filtering operations, such as deblocking, sample adaptive offset (SAO) or adaptive loop filter (ALF), so that the distortion degree caused by quantization may be effectively reduced. Since these filtered reconstructed images will be used as a reference for subsequent coded images to predict future signals, the foregoing filtering operation is also called loop filtering, that is, the filtering operation in a coded loop.

FIG. 2 shows a basic flow of a video coder. In FIG. 2, the kth CU (marked as $S_k[x, y]$) is taken as an example for illustration, where k is a positive integer not less than 1 and not greater than the number of CUs, the number of CUs is the number of CUs in the inputted current image, $S_k[x, y]$ represents a pixel point having coordinates [x, y] in the kth CU, x represents the horizontal coordinate of the pixel point, and y represents the vertical coordinate of the pixel point. The $S_k[x, y]$ is subjected to motion compensation or intra (picture) prediction to obtain a predicted signal $\widehat{S_k}[x, y]$, $S_k[x, y]$ is subtracted from $\widehat{S_k}[x, y]$ to obtain a residual signal $U_k[x, y]$, and then, the residual signal $U_k[x, y]$ is transformed and quantized. There are two different destinations for quantized outputted data: firstly, the quantized output data is sent to an entropy coder for entropy coding, and the coded code stream is outputted to a buffer for saving and waiting to be sent out; and secondly, the quantized outputted data is inversely quantized and inversely transformed to obtain a signal $U'_k[x, y]$. The signal $U''_k[x, y]$ and $\widehat{S_k}[x, y]$ are added to obtain a new predicted signal $S^{*'}_k[x, y]$, and the $S^{*'}_k[x, y]$ is sent to the buffer of the current image for saving. The $S^{*}_k[x, y]$ is subjected to intra-frame image prediction processing to obtain $f(S^{*}_k[x, y])$, the $S^{*}_k[x, y]$ is subjected to loop filtering processing to obtain $S'_k[x, y]$, and the $S'_k[x, y]$ is sent to a decoded image buffer for saving to generate reconstructed videos. The $S'_k[x, y]$ is subjected to motion compensated prediction processing to obtain $S'_r[x+m_x, y+m_y]$. The $S'_r[x+m_x, y+m_y]$ represents a reference block, and $m_x$ and $m_y$ respectively represent a horizontal component and a vertical component of a motion vector.

According to the foregoing coding process, it can be seen that at the decoding side, for each data block, after a decoder obtains the compressed code stream, entropy decoding is performed first to obtain various mode information and quantized transform coefficients. Each coefficient is inversely quantized and inversely transformed to obtain a residual signal. On the other hand, according to the known coding mode information, a predicted signal corresponding to the data block may be obtained. After the two are added, a coded data block may be obtained. Finally, the coded data block needs to be subjected to loop filtering to generate a final coded data block.

At present, mainstream video coding standards, such as HEVC, VVC, AVS3, AV1, and AV2, all use a hybrid coding framework based on blocks. They divide the original multimedia data frame into a series of coded data blocks, and combine video coding methods, such as prediction, transform and entropy coding, to achieve the compression of video data. Motion compensation is a predictive coding method commonly used in video coding. The motion compensation is used for deriving a predicted value of the current coded data block from a coded region (that is, reference data block) based on the redundancy characteristics of the video content in a time domain or a space domain. Such predictive coding method includes: inter (picture) prediction, intra block copy (IBC) prediction, intra string copy (ISC) prediction, and the like. In a specific implementation of predictive coding, these predictive coding methods may be used alone or in combination. For coded data blocks using these predictive coding methods, it is usually necessary to code at least one two-dimensional displacement vector for the code stream explicitly or implicitly, so as to indicate the displacement of the current coded data block (or the parity block of the current block) relative to at least one reference data block thereof.

It is to be understood that in different predictive coding modes, the displacement vector may have different names. The embodiments of the present disclosure are uniformly described as follows: 1) The displacement vector in inter (picture) prediction is called a motion vector (MV). 2) The displacement vector in IBC (that is, intra (picture) prediction coding) is called a block vector (BV). 3) The displacement vector in ISC is called a string vector (SV). Related technologies in inter (picture) prediction and IBC prediction are introduced below.

Figure 4:
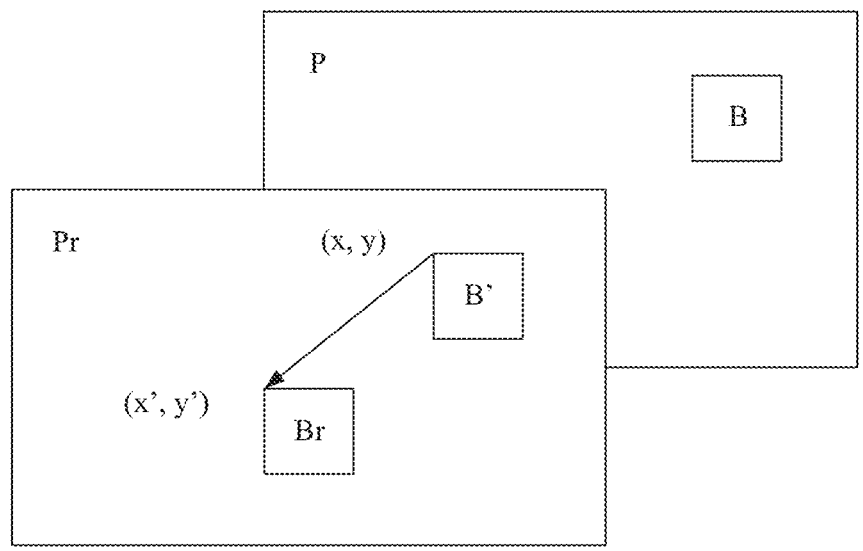
FIG. 4 is a schematic scene diagram of inter-frame coding of a multimedia data frame provided in an embodiment of the present disclosure.

1.1. Inter (picture) prediction. As shown in FIG. 4, the inter (picture) prediction uses the correlation of a time domain of a multimedia data frame to predict the pixel of the current image using the pixel of an adjacent coded image, to achieve the purpose of effectively removing the time domain redundancy of the multimedia data frame, so that the bits of coded residual data may be effectively saved. P represents the current frame, Pr represents a reference frame, B represents the current data block to be coded, and Br represents a reference data block of the B. B' and B have same coordinate positions in an image, coordinates of the Br are $(x_r, y_r)$, and coordinates of the B' are (x, y). The displacement between the current coded data block and the reference data block thereof is called an MV which may be represented by the following Formula (1):

$$MV=(x_r-x, y_r-y) \quad (1)$$

Considering the relatively strong correlation of adjacent blocks in a time domain or a space domain, an MV prediction technology may be used for further reducing the bits required for coding the MV. In H.265/HEVC, inter (picture) prediction includes two MV prediction technologies, namely Merge and AMVP.

Figure 5:
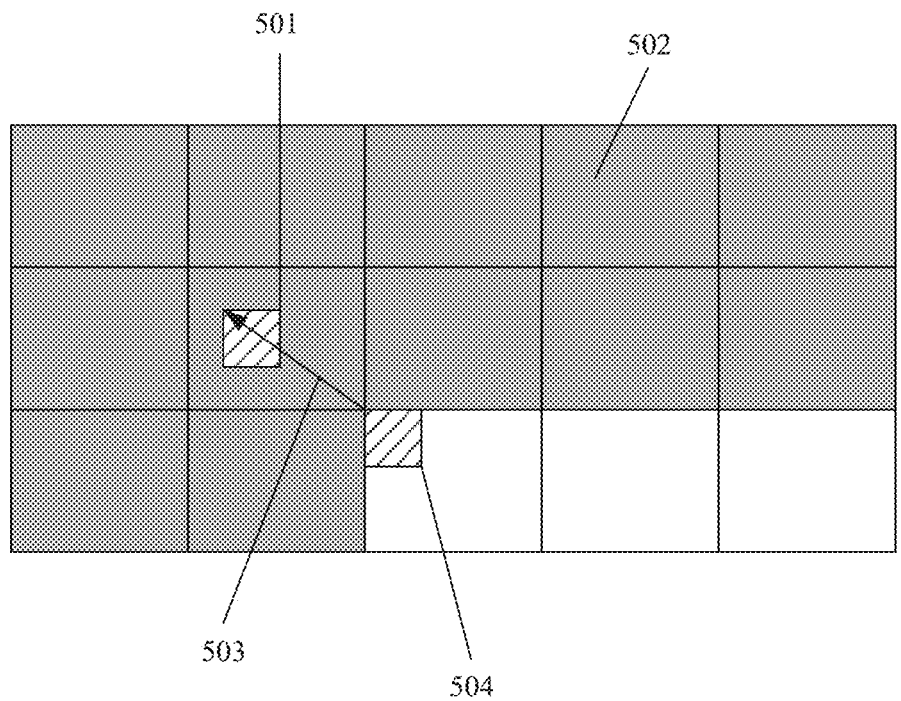
FIG. 5 is a schematic scene diagram of intra block copy (IBC) of a multimedia data frame provided in an embodiment of the present disclosure.

2.1. IBC prediction. IBC is an intra-frame coding tool adopted in the expansion of HEVC screen content coding (SCC), which significantly improves the coding efficiency of the screen content. In AVS3, VVC and AV1, the IBC technology is also adopted to improve the performance of SCC. The IBC uses the correlation of a screen content video in space to predict the pixel of the data block to be coded using the pixel of the coded data block in the multimedia data frame, so that the bits required for coding the pixel may be effectively saved. FIG. 5 is a schematic diagram of an IBC technology. As shown in FIG. 5, the data block to be coded (that is, the current block 504) and a reference data block (that is, a reference block 501) are located in a same multimedia data frame, the reference data block is located in a coded region 502, and the data block to be coded is located in an uncoded region. The displacement between the data block to be coded and the reference data block thereof is called a BV 503.

In the expansion of HEVC SCC, the IBC mode uses an implementation way similar to inter (picture) prediction. When the IBC mode is allowed for the multimedia data frame, the image which is currently decoded but not filtered is used as a special reference frame, and a mode of motion compensation with inter (picture) prediction is used by the coded data block to derive a predicted value of the data block to be coded from the reference frame. This implementation way has the following characteristics:

1) The BV only uses integer accuracy.
2) A global reference data block set (that is, a global reference scope) is used, that is, in all reconstructed parts of the current multimedia data frame, except for some regions that are prohibited from being used as reference data blocks based on the consideration of parallel processing and chromaticity interpolation, other regions may be used as reference data blocks of the data block to be coded.
3) In decoded image caches, the image which is currently decoded but not filtered will occupy a cache of an image size.
4) The image which is currently decoded but not filtered will be located at the end of a reference image list.

In a hardware implementation, a computing core may read and write data from an on-chip memory or an off-chip memory. The on-chip memory is usually a static memory with a high reading and writing speed. However, due to relatively high price of the on-chip memory, only a smaller on-chip memory is usually used. The off-chip memory is usually much larger. However, for efficient access, some rules need to be followed. There is usually a writing-back delay when the recently coded data block is written back to an off-chip picture memory. In a typical hardware implementation of motion compensation, the currently decoded image will be written to the off-chip memory after the loop filtering operation is completed for future reference. When the motion compensation of the subsequent coded data block needs to refer to the coded data block located in the off-chip memory, the relevant data of the reference data block needs to be read from the off-chip memory. This process involves memory bandwidth consumption for writing and reading. Although the IBC solution in HEVC-SCC has a smaller impact on the existing software design in a software implementation, there are two problems in a hardware implementation:

a. The reference image of the IBC is a version without loop filtering, which is different from the finally outputted decoded image. Outputting the image to the off-chip memory will increase the memory bandwidth.
b. The currently decoded or just reconstructed adjacent data block may be used as a reference for the next coded data block. This requires completing the decoding of the reconstructed data block in a limited clock period, outputting the data block to the off-chip memory, and then reading the data block into the on-chip memory. This poses a great challenge to the hardware implementation.

Figure 6:
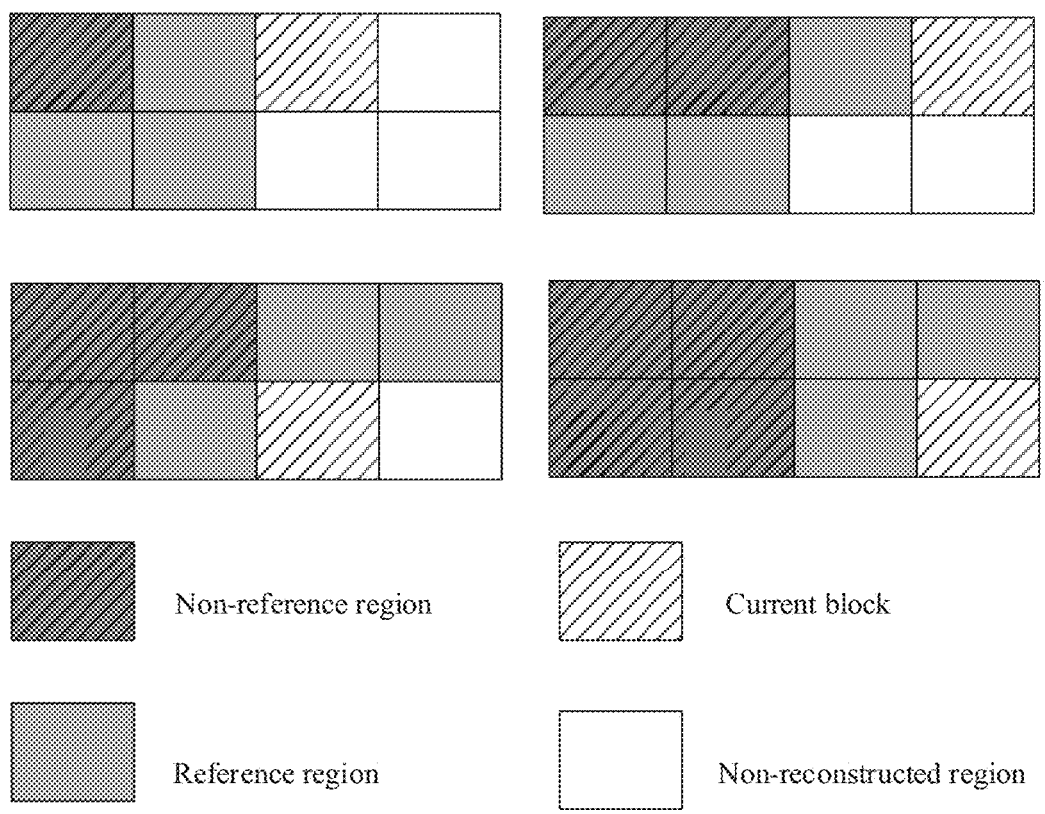
FIG. 6 is a schematic scene diagram of memory reuse of a reference data block of a multimedia data frame provided in an embodiment of the present disclosure.

In view of the problem of the hardware implementation of IBC, some IBC-related optimization solutions are used in subsequent standards, such as VVC, AVS3 and AV1. The IBC solutions in the VVC and AVS3 standards use a local reference data block set, that is, a coded data block adjacent to the current coded data block is used as a reference data block of the current coded data block. In a specific hardware implementation, reference data blocks in a local reference data block set stored in an on-chip memory may be used for solving the above problems. Based on the consideration of the hardware implementation cost and coding performance, the IBC only uses one CTU-sized reference data block in the local reference data block set stored in the memory, and uses a reference memory reconstruction strategy as shown in FIG. 6. In addition to the 64×64 CU that stores the current data blocks to be reconstructed, there are three 64×64 CUs that may be used for storing the reconstructed data blocks.

Therefore, the IBC may only search reference data blocks in these three 64×64 CUs and the reconstructed part of the current 64×64 CU.

In conclusion, the IBC solution in the AV1 standard uses a global reference data block set, that is, the current coded data block is allowed to refer to the coded data block in the current multimedia data frame. However, this solution has the following two defects: a. In order to meet the requirements of writing-back restriction conditions, the coded data block adjacent to the current coded data block is not allowed to be used as a reference data block. b. If the current multimedia data frame is allowed to use the IBC, the loop filter will be prohibited. However, a screen content sequence often has a relatively strong spatial correlation, and adjacent data blocks have relatively high reference value. Allowing adjacent coded data blocks to be referenced will help improve the coding performance. In some sequence contents, prohibiting the loop filter will also cause the reduction of multimedia data quality and affect the coding performance. Although the IBC solution based on the local reference data block set does not have the foregoing defects, due to the limited number of reference data blocks available in the local reference data block set, using only the local reference data block set may reduce the coding performance of the multimedia data frame. According to the characteristics of sequence contents, the coding parameters of the global reference data block set, the local reference data block set, the loop filtering, and the like have different proportions on the coding performance. Therefore, based on the defects in the IBC solution of the global reference data block set and the IBC solution of the local reference data block set, through the embodiments of the present disclosure, an appropriate predictive coding mode is selected according to the attribute information of the multimedia data frame, which is favorable for improving the coding performance. In other words, the embodiments of the present disclosure provide a global reference data block set and a local reference data block set, which is beneficial for a coding terminal to adaptively select a reference data block from the global reference data block set and the local reference data block set according to the attribute information of the current coded data block, so that the selection scope of reference data blocks is extended, and the problem of the limited number of reference data blocks may be solved. Further, the current coded data block is predictively coded according to the selected reference data block, which may improve the coding performance of the multimedia data frame.

As an example, the method provided in the embodiments of the present disclosure may be performed by a terminal, a server, or a terminal and a server together. The devices for performing the method in the embodiments of the present disclosure may be collectively referred to as computer devices. The server may be an independent physical server, a server cluster or distributed system composed of at least two physical servers, or a cloud server that provides basic cloud computing services, such as cloud services, cloud databases, cloud computing, cloud functions, cloud storage, network services, cloud communications, middleware services, domain name services, security services, content delivery networks (CDNs), big data and artificial intelligence platforms. The terminal may be a smart vehicle-mounted terminal, a smart video camera, a smart phone, a tablet computer, a notebook computer, a desktop computer, a smart speaker, a speaker with a screen, a smart watch, a smart television, or the like, but is not limited thereto. The terminal and the server may be connected directly or indirectly in a mode of wired or wireless communication, and furthermore, one or at least two terminals and servers may be provided, which are not limited in the present disclosure.

As an example, the embodiments of the present disclosure may be applied to various scenes, including but not limited to cloud technology, artificial intelligence, intelligent transport, aided driving, and the like. For example, in an intelligent transport scene, the multimedia data frame is a video frame or an image frame obtained by shooting the road through a camera head, where the camera head may be a vehicle-mounted terminal or a camera head on a road side. According to the present disclosure, the multimedia data frame is predictively coded, which is favorable for improving the coding performance of the multimedia data frame; and road conditions may be observed in real time through the coded multimedia data frame, so as to improve the driving safety of vehicles.

Figure 7:
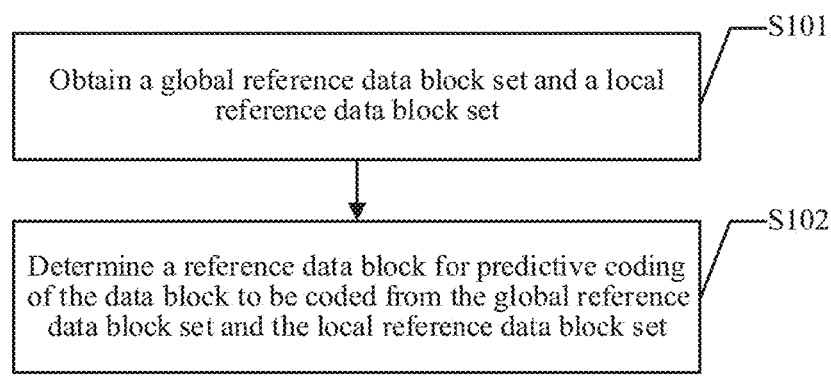
FIG. 7 is a schematic flow diagram of a multimedia data processing method provided in an embodiment of the present disclosure.

Referring to FIG. 7, FIG. 7 is a schematic flow diagram of a multimedia data processing method provided in an embodiment of the present disclosure. As shown in FIG. 7, the method may at least include S101 to S102.

S101: Obtain a global reference data block set and a local reference data block set. The global reference data block set and the local reference data block set are associated with a data block to be coded in a multimedia data frame, the global reference data block set includes a coded data block having no adjacent relationship with the data block to be coded in the multimedia data frame, and the local reference data block set includes a coded data block having an adjacent relationship with the data block to be coded in the multimedia data frame.

Through the embodiment of the present disclosure, the computer device may obtain a multimedia data frame. The multimedia data frame may be shot by the computer device, or the multimedia data frame may be downloaded from the network by the computer device. The multimedia data frame refers to a video frame to be coded in video data or one frame of image to be coded in image data. The video data may refer to live video data, film and television video data, daily life video data, road monitoring video data, and the like. The image data may refer to person image data, building image data, object image data, and the like. Further, the computer device may obtain a global reference data block set associated with the multimedia data frame according to at least one of the information, such as a coding mode, a writing-back delay and a correlation between the coded data block and the data block to be coded, and may obtain a global reference data block set and a local reference data block set according to at least one of the information, such as a size of a storage space for storing the local reference data block set and a correlation between the coded data block and the data block to be coded.

As an example, the global reference data block set and the local reference data block set are respectively stored in a first storage space and a second storage space. The first storage space and the second storage space may be located in a same computer device or in different computer devices. The first storage space and the second storage space may specifically refer to magnetic disks, storage medium arrays, or the like, which are not limited in the embodiment of the present disclosure. When the first storage space and the second storage space are located in a same computer device, the first storage space may refer to an off-chip memory of the computer device, and the second storage space may refer to an on-chip memory of the computer device; alternatively, the first storage space may refer to an on-chip memory of the computer device, and the second storage space may refer to an off-chip memory of the computer device. This is not limited in the embodiment of the present disclosure.

S102: Determine a reference data block for predictive coding of the data block to be coded from the local reference data block set and the global reference data block set.

Through the embodiments of the present disclosure, the computer device may obtain the global reference data block set and the local reference data block set, which is beneficial to adaptively select a reference data block from the global reference data block set and the local reference data block set according to application scenes or user requirements, so as to perform predictive coding of the data block to be coded in the multimedia data frame according to the reference data block. As a result, the selection scope of reference data blocks is extended, and the coding performance of multimedia data frames may be improved.

For example, the computer device may obtain attribute information of the data block to be coded, and determine a reference data block for predictive coding of the data block to be coded from the local reference data block set and the global reference data block set according to the attribute information of the data block to be coded. The attribute information of the data block to be coded includes at least one of the following: a media type of the multimedia data frame to which the data block to be coded belongs, a reference mark of the multimedia data frame, and a definition of the multimedia data frame to which the data block to be coded belongs. The media type includes an intra-frame type and an inter-frame type. The intra-frame type may refer to a representative multimedia data frame. The intra-frame type is a full intra-coded frame, such as an Intra frame, an I frame and a key frame. This type of frame only allows the use of an intra-frame coding technology. The intra-frame coding technology includes an IBC mode or an ISC mode, and does not need to rely on other frames for coding. For example, the intra-frame type may refer to a multimedia data frame that may reflect the main meaning in video data or image data. The inter-frame type may refer to multimedia data frames in video data or image data other than the intra-frame type. The inter-frame type may be called an inter-coded frame, such as a P frame, a B frame and a non-key frame. This type of frame allows the use of an inter-frame coding technology and an intra-frame coding technology. Generally, when the inter-frame coding technology is used, the coding may be performed after the reference frame coding is completed. The reference mark of the multimedia data frame is used for reflecting the selection scope of the reference data block of the data block to be coded (that is, which reference data block set is selected).

Through the embodiments of the present disclosure, the computer device may obtain the global reference data block set and the local reference data block set, so a coding terminal may adaptively select a reference data block from the global reference data block set and the local reference data block set according to application scenes or user requirements, so as to perform predictive coding of the data block to be coded in the multimedia data frame according to the reference data block. As a result, the selection scope of reference data blocks is extended, and the coding performance of multimedia data frames may be improved.

In some embodiments, the computer device may select one of the following two modes according to the coding mode of the multimedia data frame to obtain a global reference data block set.

Mode 1: The global reference data block set includes at least one first reference data block; in a case that the coding mode of the multimedia data frame is a serial coding mode, the first reference data block in the global reference data block set is a coded data block having a parameter association relationship meeting writing-back restriction conditions in the multimedia data frame and belonging to a same tile as the data block to be coded; the parameter association relationship is used for reflecting the association relationship between the first position information and the second position information and the association relationship between the first position information and the size information of an SB, the first position information refers to the position information of the coded data block in the multimedia data frame, and the second position information refers to the position information of the data block to be coded in the multimedia data frame; and the writing-back restriction conditions are used for reflecting the restricted delay of writing the coded data block to the global reference data block set. In other words, the serial coding mode means that only one data block in the multimedia data frame is predictively coded at the same time. In a case that the coding mode of the multimedia data frame is a serial coding mode, this coding mode will not affect the determination process of the reference data block. However, writing the coded data block to the global reference data block set will cause a larger writing-back delay, that is, writing the coded data block to the global reference data block set will take a longer time. Therefore, the coded data block may only be used as a reference data block after waiting at least a preset time. The preset time is determined according to the restricted delay of writing the coded data block to the global reference data block set. The restricted delay may refer to one of an average delay, a maximum delay and a minimum delay of writing the coded data block to the global reference data block set. Therefore, in a case that the coding mode of the multimedia data frame is a serial coding mode, the first reference data block in the global reference data block set needs to meet the following two conditions: a. belonging to a same tile as the data block to be coded; and b. having a parameter association relationship meeting writing-back restriction conditions.

Figure 14:
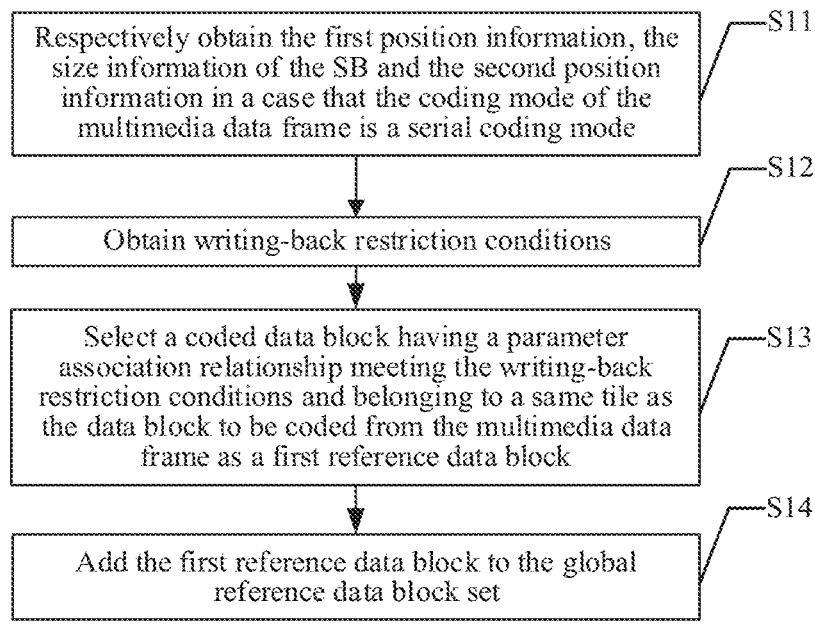
FIG. 14 is a schematic flow diagram of a multimedia data processing method provided in an embodiment of the present disclosure.

Referring to FIG. 14, the computer device may perform operations s11 to s14 shown in FIG. 14 to obtain a global reference data block set.

s11: Respectively obtain the first position information, the size information of the SB and the second position information in a case that the coding mode of the multimedia data frame is a serial coding mode, the first position information referring to the position information of the coded data block in the multimedia data frame, and the second position information referring to the position information of the data block to be coded in the multimedia data frame.

s12: Obtain writing-back restriction conditions, the writing-back restriction conditions being used for reflecting the restricted delay of writing the coded data block to the global reference data block set.

s13: Select a coded data block having a parameter association relationship meeting the writing-back restriction conditions and belonging to a same tile as the data block to be coded from the multimedia data frame as a first reference data block, the parameter association relationship being used for reflecting the association relationship between the first position information and the second position information and the association relationship between the first position information and the size information of the SB.

s14: Add the first reference data block to the global reference data block set.

In operations s11 to s14, in a case that the coding mode of the multimedia data frame is a serial coding mode, the computer device may respectively obtain the first position information, the size information of the SB and the second position information. The first position information refers to the position information of the coded data block in the multimedia data frame, the second position information refers to the position information of the data block to be coded in the multimedia data frame, the first position information may refer to the coordinates of the pixel of the coded data block in the multimedia data frame, the second position information may refer to the coordinates of the pixel of the data block to be coded in the multimedia data frame, and the size information of the SB may refer to the width and height of the SB. The computer device may obtain writing-back restriction conditions; select a coded data block having a parameter association relationship meeting the writing-back restriction conditions and belonging to a same tile as the data block to be coded from the multimedia data frame as a first reference data block; and add the first reference data block to the global reference data block set. The first reference data block is selected according to the writing-back restriction conditions, the first position information, the second position information and the size information of the SB, so as to ensure that the first reference data block has a relatively strong spatial correlation with the data block to be coded, and ensure the availability of the first reference data block.

Figure 15:
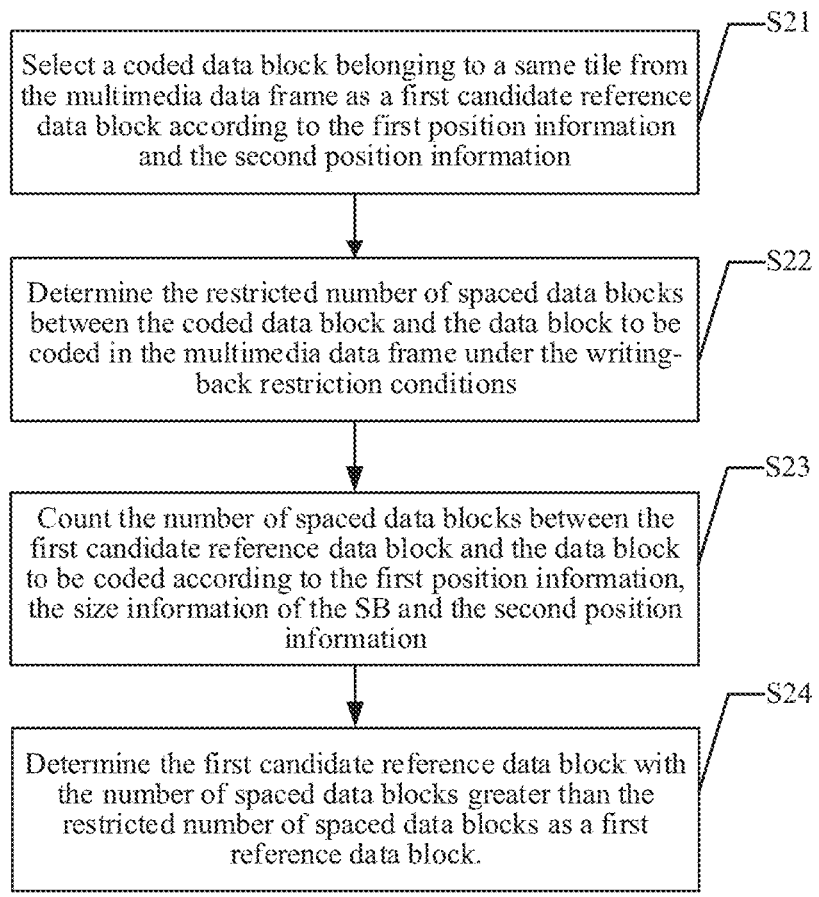
FIG. 15 is a schematic flow diagram of a multimedia data processing method provided in an embodiment of the present disclosure.

In some embodiments, referring to FIG. 15, operation s13 may be implemented by operations s21 to s24 shown in FIG. 15.

s21: Select a coded data block belonging to a same tile from the multimedia data frame as a first candidate reference data block according to the first position information and the second position information.

s22: Determine the restricted number of spaced data blocks between the coded data block and the data block to be coded in the multimedia data frame under the writing-back restriction conditions.

s23: Count the number of spaced data blocks between the first candidate reference data block and the data block to be coded according to the first position information, the size information of the SB and the second position information.

s24: Determine the first candidate reference data block with the number of spaced data blocks greater than the restricted number of spaced data blocks as a first reference data block.

In operations s21 to s24, assuming that the first position information may refer to the coordinates of the pixel of the coded data block in the multimedia data frame, the second position information may refer to the coordinates of the pixel of the data block to be coded in the multimedia data frame, the position information of the coded data block is (ref_x, ref_y), and the position information of the data block to be coded is (cur_x, cur_y), the computer device may select a coded data block belonging to a same tile as the data block to be coded from the multimedia data frame as a first candidate reference data block; determine the restricted number of spaced data blocks between the coded data block and the data block to be coded in the multimedia data frame under the writing-back restriction conditions, where the restricted number of spaced data blocks may refer to the minimum number of data blocks needing to be spaced between the coded data block and the data block to be coded in the multimedia data frame in a case that the writing-back restriction conditions are met; then count the number of spaced data blocks between the first candidate reference data block and the data block to be coded according to the first position information, the size information of the SB and the second position information, where the number of spaced data blocks refers to the number of data blocks actually spaced between the first candidate reference data block and the data block to be coded; and determine the first candidate reference data block with the number of spaced data blocks greater than the restricted number of spaced data blocks as a first reference data block. The global reference data block set is obtained according to the position information of the coded data block, the position information of the data block to be coded and the writing-back delay restriction conditions, so as to ensure that the first reference data block has a relatively strong spatial correlation with the data block to be coded, and ensure the availability of the first reference data block. Furthermore, additional hardware cost is not needed, thereby saving the cost.

For example, the computer device may use the first candidate reference data block meeting the following Formula (2) as a first reference data block:

$$D < \text{cur\_num} - \text{src\_num} \qquad (2),$$

where in Formula (2), cur_num−src_num represents the number of spaced data blocks between the first candidate reference data block and the data block to be coded, cur_num refers to the serial number of the first candidate reference data block, src_num refers to the serial number of the data block to be coded, D refers to the restricted number of the spaced data blocks in a case that the writing-back restriction conditions are met, and cur_num and src_num may be computed by the following Formula (3) and Formula (4).

Figure 16:
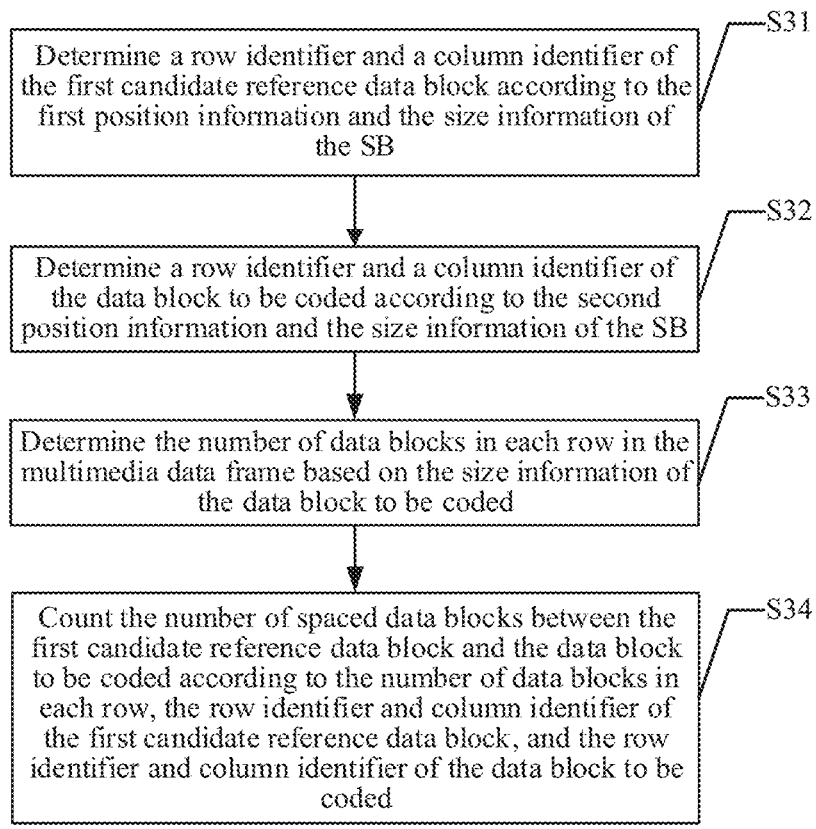
FIG. 16 is a schematic flow diagram of a multimedia data processing method provided in an embodiment of the present disclosure.

In some embodiments, referring to FIG. 16, operation s23 may include operations s31 to s34 shown in FIG. 16.

s31: Determine a row identifier and a column identifier of the first candidate reference data block according to the first position information and the size information of the SB.

s32: Determine a row identifier and a column identifier of the data block to be coded according to the second position information and the size information of the SB.

s33: Determine the number of data blocks in each row in the multimedia data frame based on the size information of the data block to be coded.

s34: Count the number of spaced data blocks between the first candidate reference data block and the data block to be coded according to the number of data blocks in each row, the row identifier and column identifier of the first candidate reference data block, and the row identifier and column identifier of the data block to be coded.

In operations s31 to s34, the row identifier of the first candidate reference data block is ref_y_num, the column identifier of the first candidate reference data block is ref_x_num, the row identifier of the data block to be coded is cur_x_num, and the column identifier of the data block to be coded is cur_y_num. The computer device may respectively obtain the row identifier and column identifier of the first candidate reference data block and the row identifier and column identifier of the data block to be coded by the following Formula (3):

$$\begin{cases} \text{cur\_y\_num} = \text{Floor}(\text{cur\_y}/H) \\ \text{cur\_x\_num} = \text{Floor}(\text{cur\_x}/W) \\ \text{ref\_y\_num} = \text{Floor}(\text{ref\_y}/H) \\ \text{ref\_x\_num} = \text{Floor}(\text{ref\_x}/W) \end{cases} \qquad (3)$$

where in Formula (3), Floor ( ) represents rounding down, and W and H may be determined in any of the following four modes: 1. W and H may be determined according to the size information of the SB. 2. W and H may be determined according to the size information of basic units (VPDU, Virtual Pipeline Data Units) of an on-chip memory. 3. H may be determined according to the size information of the SB, for example, if the SB is 128×128, H is 128, and if the SB is 64×64, H is 64. W may be a default value, such as 64. 4. W and H may be preset values, such as 4, 64 and 128. One SB may include at least one data block, and the size of the SB and the size of the data block are specifically determined according to a partitioned mode of the multimedia data frame.

Then, the computer device may determine the number of data blocks in each row in the multimedia data frame based on the size information of the data block to be coded; determine the serial number of the first candidate reference data block according to the number of data blocks in each row and the row identifier and column identifier of the first candidate reference data block, and determine the serial number of the data block to be coded according to the number of data blocks in each row and the row identifier and column identifier of the data block to be coded; and determine the difference between the serial number of the first candidate reference data block and the serial number of the data block to be coded as the number of spaced data blocks between the first candidate reference data block and the data block to be coded. For example, the computer device may determine the number of data blocks in each row in the multimedia data frame, the serial number of the first candidate reference data block and the serial number of the data block to be coded by the following Formula (4):

$$\begin{cases} \text{stride} = \text{Ceil}(\text{tile\_w}/W) \\ \text{cur\_num} = \text{cur\_y\_num} * \text{stride} + \text{cur\_x\_num}, \\ \text{src\_num} = \text{ref\_y\_num} * \text{stride} + \text{ref\_x\_num} \end{cases} \quad (4)$$

where in Formula (4), stride refers to the number of data blocks in each row in the multimedia data frame, cur_num refers to the serial number of the first candidate reference data block, src_num refers to the serial number of the data block to be coded, Ceil( ) represents rounding up, and tile_w represents the width of the tile. The tile includes at least one SB, so the width of the tile may be determined according to the size information of the SB. For example, when the size of the SB is 128×128, the size of the tile may be 1024×720.

For example, the first position information refers to the coordinates of the coded data block in the multimedia data frame, and the second position information refers to the coordinates of the data block to be coded in the multimedia data frame; in a case that the coding mode of the multimedia data frame is a serial coding mode, the size of the SB is 128×128, the width and height of the tile are 1024 and 720 respectively, and the values of W and H are equal to 64; moreover, when the restricted number of spaced data blocks between the coded data block and the data block to be coded under the writing-back restriction conditions is 4, the first reference data block in the global reference data block set is a coded data block belonging to a same tile as the data block to be coded and having coordinates meeting the following Formula (5); and the restricted number of spaced data blocks may refer to the minimum number of data blocks needing to be spaced between the coded data block and the data block to be coded in the multimedia data frame in a case that the writing-back restriction conditions are met.

$$(\text{Floor}(\text{ref\_y}/128)*16+\text{Floor}(\text{ref\_x}/64))<(\text{Floor}(\text{cur\_y}/128)*16+\text{Floor}(\text{cur\_x}/64))-4 \quad (5),$$

where in Formula (5), (ref_x, ref_y) represents the coordinates of the coded data block in the multimedia data frame, (cur_x, cur_y) represents the coordinates of the data block to be coded in the multimedia data frame, and Floor( ) represents rounding down.

For another example, the first position information and the second position information respectively refer to the coordinates of the coded data block in the multimedia data frame and the coordinates of the data block to be coded in the multimedia data frame; in a case that the coding mode of the multimedia data frame is a serial coding mode, the size of the SB is 64×64, the width and height of the tile are 1024 and 720 respectively, and the values of W and H are equal to 64; and moreover, when the restricted number of spaced data blocks between the coded data block and the data block to be coded under the writing-back restriction conditions is 4, the first reference data block in the global reference data block set is a coded data block belonging to a same tile as the data block to be coded and having coordinates meeting the following Formula (6).

$$(\text{Floor}(\text{ref\_y}/64)*16+\text{Floor}(\text{ref\_x}/64))<(\text{Floor}(\text{cur\_y}/64)*16+\text{Floor}(\text{cur\_x}/64))-4 \quad (6),$$

where (ref_x, ref_y) represents the coordinates of the coded data block in the multimedia data frame, (cur_x, cur_y) represents the coordinates of the data block to be coded in the multimedia data frame, and Floor( ) represents rounding down.

It is to be understood that in a case that the coding mode of the multimedia data frame is a serial coding mode, the computer device may also obtain a global reference data block set by: determining a spacing distance between the coded data block and the data block to be coded according to the first position information, the second position information and the size information of the SB, and determining a spacing restriction distance between the coded data block and the data block to be coded under the writing-back delay conditions, the spacing restriction distance referring to a minimum spacing distance between the coded data block and the data block to be coded under the writing-back delay conditions; using the coded data block belonging to a same tile as the data block to be coded in the multimedia data frame and having a spacing distance greater than the spacing restriction distance as a first reference data block; and adding the first reference data block to the global reference data block set.

In some embodiments, the adjacent relationship between the data block to be coded and the coded data block may mean that the coding order of the data block to be coded is adjacent to the coding order of the coded data block; and no adjacent relationship between the data block to be coded and the coded data block may mean that the coding order of the data block to be coded is not adjacent to the coding order of the coded data block.

Mode 2: The global reference data block set includes at least one second reference data block; in a case that the coding mode of the multimedia data frame is a parallel coding mode or a serial coding mode, the second reference data block in the global reference data block set is a coded data block belonging to a same tile as the data block to be coded and having a parameter association relationship meeting writing-back restriction conditions in the multimedia data frame and meeting coding processing conditions; the parameter association relationship is used for reflecting the association relationship among the position information of the coded data block in the multimedia data frame, the position information of the data block to be coded in the multimedia data frame, and the size information of the SB; and the writing-back restriction conditions are used for reflecting the restricted delay of writing the coded data block to the global reference data block set. In other words, the parallel coding mode means that multiple data blocks in the multimedia data frame are predictively coded at the same time. In a case that the coding mode of the multimedia data frame is a parallel coding mode, this coding mode will affect the determination process of the reference data block. Furthermore, writing the coded data block to the global reference data block set will cause a larger writing-back delay. Therefore, in a case that the coding mode of the multimedia data frame is a parallel coding mode, the second reference data block in the global reference data block set needs to meet the following three conditions: a: belonging to a same tile as the data block to be coded; b: having a parameter association relationship meeting writing-back restriction conditions; and c: having the parameter association relationship meeting coding processing conditions. In a case that the coding mode of the multimedia data frame is a serial coding mode, a global reference data block set may also be obtained in the mode 2. Herein, the coding processing conditions may refer to parallel coding processing conditions.

Figure 17:
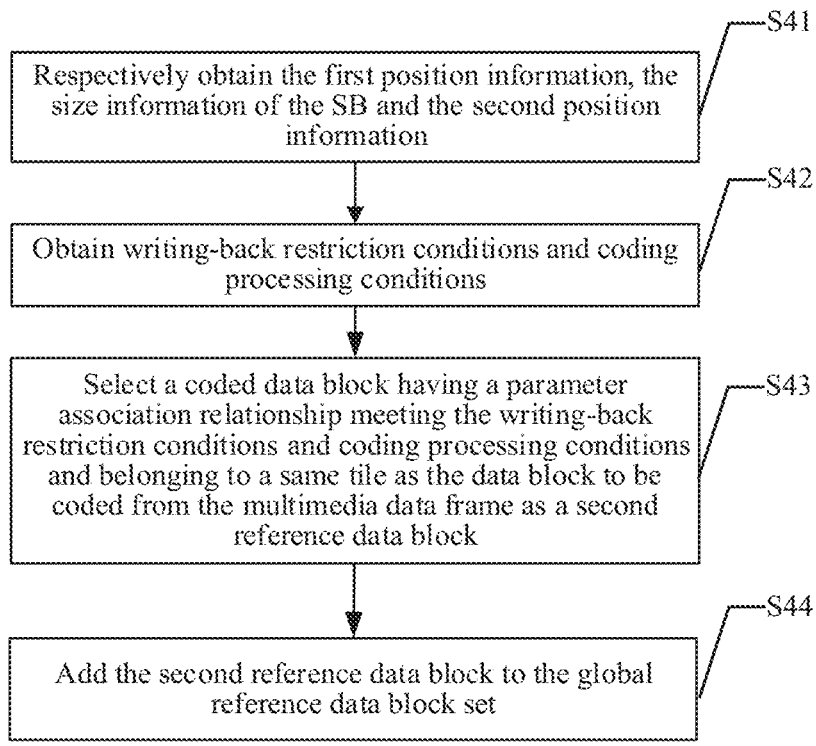
FIG. 17 is a schematic flow diagram of a multimedia data processing method provided in an embodiment of the present disclosure.

Referring to FIG. 17, the computer device may perform operations s41 to s44 shown in FIG. 17 to obtain a global reference data block set.

s41: Respectively obtain the first position information, the size information of the SB and the second position information, the first position information referring to the position information of the coded data block in the multimedia data frame, and the second position information referring to the position information of the data block to be coded in the multimedia data frame.

s42: Obtain writing-back restriction conditions and coding processing conditions, the writing-back restriction conditions being used for reflecting the restricted delay of writing the coded data block to the global reference data block set.

s43: Select a coded data block having a parameter association relationship meeting the writing-back restriction conditions and coding processing conditions and belonging to a same tile as the data block to be coded from the multimedia data frame as a second reference data block, the parameter association relationship being used for reflecting the association relationship between the first position information and the size information of the data block to be coded and the association relationship between the first position information and the second position information.

s44: Add the second reference data block to the global reference data block set.

In operations s41 to s44, the first position information may refer to the coordinates of the pixel of the coded data block in the multimedia data frame, the second position information may refer to the coordinates of the pixel of the data block to be coded in the multimedia data frame, and the size information of the SB may refer to the width and height of the SB. The writing-back restriction conditions are used for reflecting the restricted delay of writing the coded data block to the global reference data block set, and the coding processing conditions are used for reflecting the restriction distance between the reference data block and the data block to be coded when the multimedia data frame is coded in parallel; alternatively, the coding processing conditions are used for reflecting the restricted number of spaced data blocks between the reference data block and the data block to be coded when the multimedia data frame is coded in parallel. A coded data block having a parameter association relationship meeting the writing-back restriction conditions and coding processing conditions and belonging to a same tile as the data block to be coded is selected from the multimedia data frame as a second reference data block, and the second reference data block is added to the global reference data block set, so as to ensure that the second reference data block has a relatively strong spatial correlation with the data block to be coded, and ensure the availability of the second reference data block.

Figure 18:
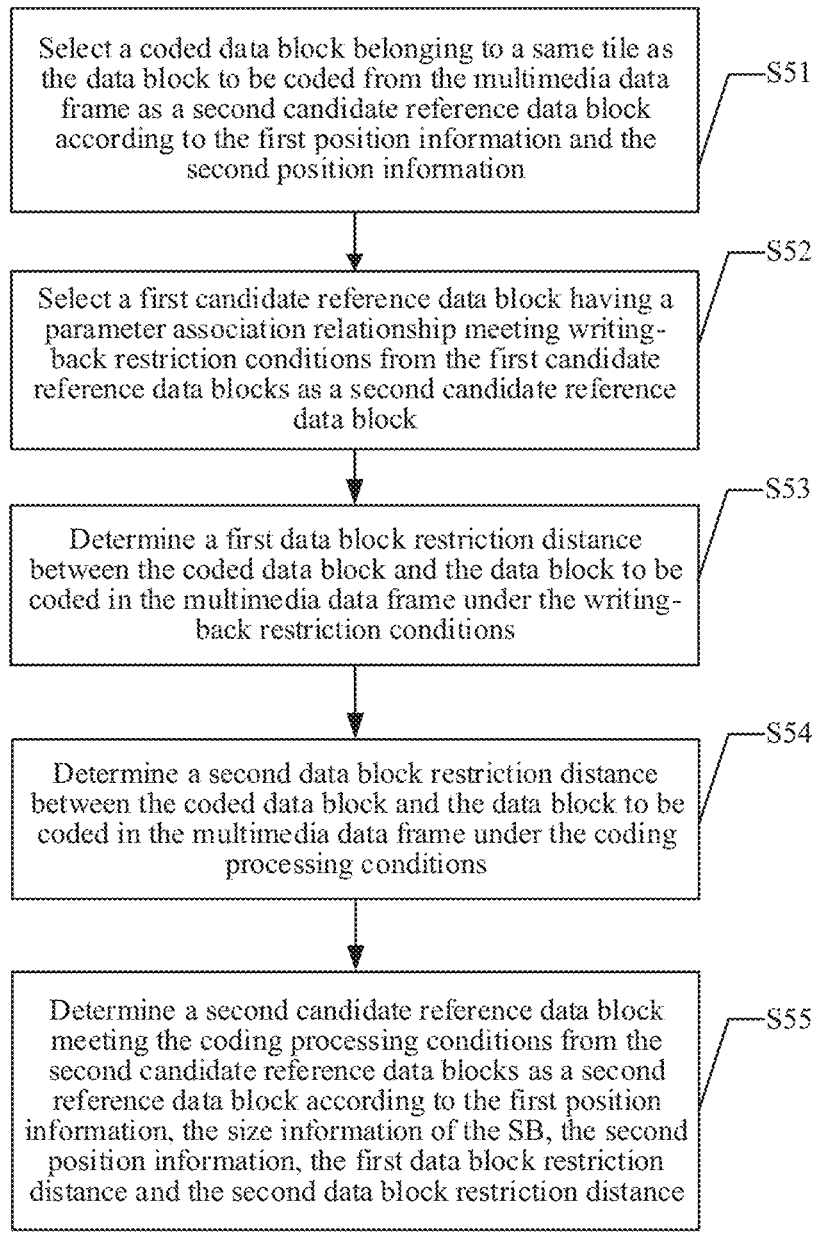
FIG. 18 is a schematic flow diagram of a multimedia data processing method provided in an embodiment of the present disclosure.

In some embodiments, referring to FIG. 18, operation s43 may include operations s51 to s55 shown in FIG. 18.

s51: Select a coded data block belonging to a same tile as the data block to be coded from the multimedia data frame as a second candidate reference data block according to the first position information and the second position information.

s52: Select a first candidate reference data block having a parameter association relationship meeting writing-back restriction conditions from the first candidate reference data blocks as a second candidate reference data block.

s53: Determine a first data block restriction distance between the coded data block and the data block to be coded in the multimedia data frame under the writing-back restriction conditions.

s54: Determine a second data block restriction distance between the coded data block and the data block to be coded in the multimedia data frame under the coding processing conditions.

s55: Determine a second candidate reference data block meeting the coding processing conditions from the second candidate reference data blocks as a second reference data block according to the first position information, the size information of the SB, the second position information, the first data block restriction distance and the second data block restriction distance.

In operations s51 to s55, assuming that the first position information may refer to the coordinates of the pixel of the coded data block in the multimedia data frame, the second position information may refer to the coordinates of the pixel of the data block to be coded in the multimedia data frame, the position information of the coded data block is (ref_x, ref_y), and the position information of the data block to be coded is (cur_x, cur_y), the computer device may select a coded data block belonging to a same tile as the data block to be coded from the multimedia data frame as a first candidate reference data block. The computer device may select a first candidate reference data block having coordinates meeting the foregoing Formula (4) from the first candidate reference data blocks as a second candidate reference data block; determine a first data block restriction distance between the coded data block and the data block to be coded in the multimedia data frame under the writing-back restriction conditions, where the first data block restriction distance may refer to a minimum distance needing to be kept between the coded data block and the data block to be coded in the multimedia data frame in a case that the writing-back delay restriction conditions are met; determine a second data block restriction distance between the coded data block and the data block to be coded in the multimedia data frame under the coding processing conditions, where the second data block restriction distance refers to a minimum distance needing to be kept between the coded data block and the data block to be coded in the multimedia data frame in a case that the coding processing conditions are met; and then determine a second candidate reference data block meeting the coding processing conditions from the second candidate reference data blocks as a second reference data block according to the first position information, the size information of the SB, the second position information, the first data block restriction distance and the second data block restriction distance.

Figure 19:
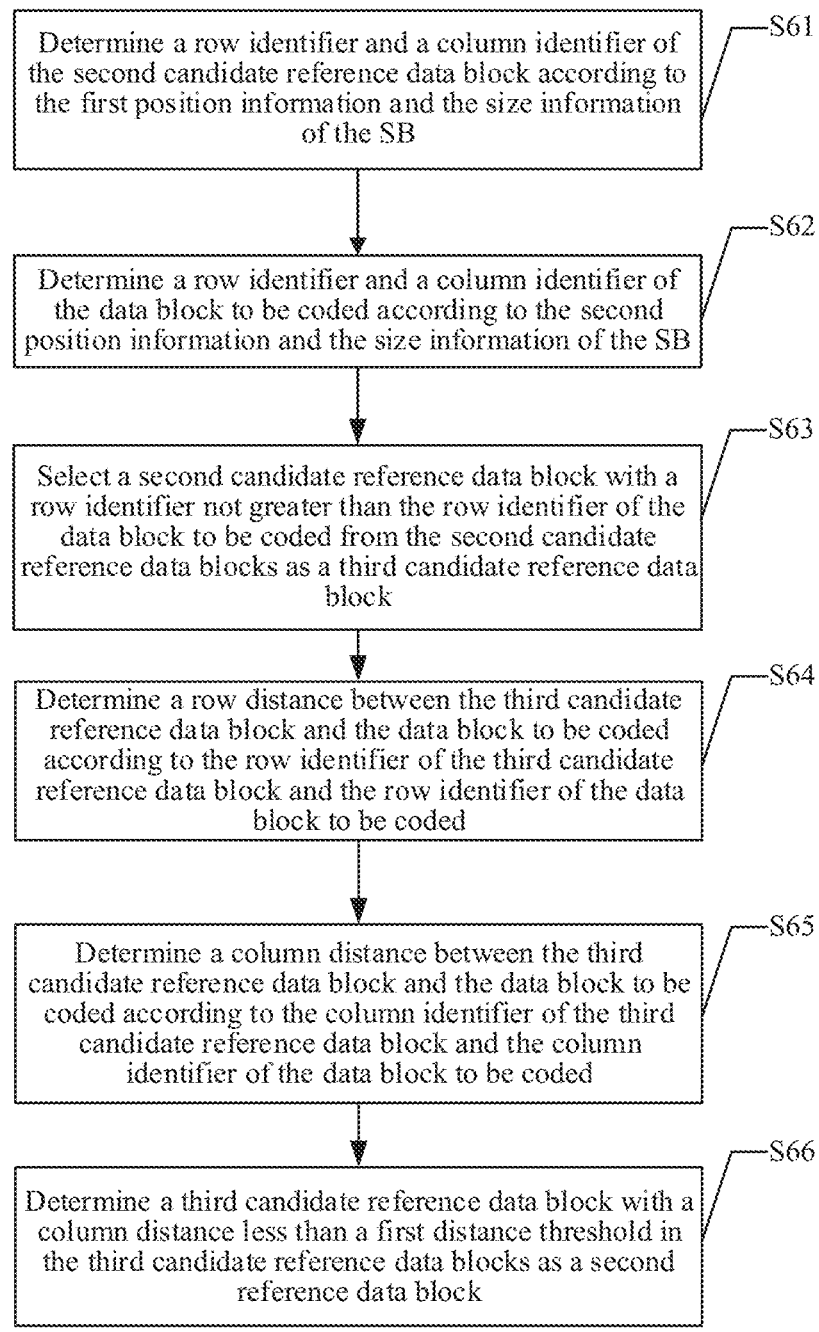
FIG. 19 is a schematic flow diagram of a multimedia data processing method provided in an embodiment of the present disclosure.

In some embodiments, referring to FIG. 19, operation s55 may include operations s61 to s66 shown in FIG. 19.

s61: Determine a row identifier and a column identifier of the second candidate reference data block according to the first position information and the size information of the SB.

s62: Determine a row identifier and a column identifier of the data block to be coded according to the second position information and the size information of the SB.

s63: Select a second candidate reference data block with a row identifier not greater than the row identifier of the data block to be coded from the second candidate reference data blocks as a third candidate reference data block.

s64: Determine a row distance between the third candidate reference data block and the data block to be coded according to the row identifier of the third candidate reference data block and the row identifier of the data block to be coded.

s65: Determine a column distance between the third candidate reference data block and the data block to be coded according to the column identifier of the third candidate reference data block and the column identifier of the data block to be coded.

s66: Determine a third candidate reference data block with a column distance less than a first distance threshold in the third candidate reference data blocks as a second reference data block. The first distance threshold is determined according to the first data block restriction distance, the second data block restriction distance, and the row distance between the third candidate reference data block and the data block to be coded.

In operations s61 to s66, the computer device may respectively obtain the row identifier and column identifier of the second candidate reference data block and the row identifier and column identifier of the data block to be coded by the foregoing Formula (5); then select a second candidate reference data block with a row identifier not greater than the row identifier of the data block to be coded from the second candidate reference data blocks as a third candidate reference data block; determine the difference between the row identifier of the third candidate reference data block and the row identifier of the data block to be coded as a row distance between the third candidate reference data block and the data block to be coded; determine the difference between the column identifier of the third candidate reference data block and the column identifier of the data block to be coded as a column distance between the third candidate reference data block and the data block to be coded; and determine a third candidate reference data block with a column distance less than a first distance threshold in the third candidate reference data blocks as a second reference data block. For example, the computer device may determine the second candidate reference data block having coordinates meeting the following Formula (7) as a second reference data block:

$$\begin{cases} \text{ref\_y\_num} <= \text{cur\_y\_num} \\ \text{ref\_x\_num} - \text{cur\_x\_num} < -P + \\ (P+E)*(\text{cur\_y\_num} - \text{ref\_y\_num}) \end{cases} \quad (7)$$

where in Formula (7), ref_y_num refers to the row identifier of the second candidate reference data block, ref_x_num refers to the column identifier of the second candidate reference data block, cur_y_num refers to the row identifier of the data block to be coded, cur_x_num refers to the column identifier of the data block to be coded, P refers to the first data block restriction distance between the coded data block and the data block to be coded in the multimedia data frame under the writing-back restriction conditions, and E refers to the second data block restriction distance between the coded data block and the data block to be coded in the multimedia data frame under the coding processing conditions. The first data block restriction distance may be determined according to the restricted number of spaced data blocks between the coded data block and the data block to be coded in the multimedia data frame under the writing-back restriction conditions, for example, P and the foregoing D may be the same in value. The second data block restriction distance may be determined according to the restricted number of spaced data blocks between the coded data block and the data block to be coded in the multimedia data frame under the coding processing conditions. ref_x_num−cur_x_num represents the column distance between the third candidate reference data block and the data block to be coded, and cur_y_num−ref_y_num represents the row distance between the third candidate reference data block and the data block to be coded.

For example, the first position information refers to the coordinates of the coded data block in the multimedia data frame, and the second position information refers to the coordinates of the data block to be coded in the multimedia data frame; in a case that the coding mode of the multimedia data frame is a parallel coding mode or a serial coding mode, the size of the SB is 128×128, the width and height of the tile are 1024 and 720 respectively, and the values of W and H are equal to 64; and when the restriction distance of spaced data blocks between the coded data block and the data block to be coded under the writing-back restriction conditions is 4 and the restriction distance of spaced data blocks between the coded data block and the data block to be coded under the coding processing conditions is 2, the second reference data block in the global reference data block set is a coded data block belonging to a same tile as the data block to be coded and having coordinates meeting the following Formula (8):

$$\begin{cases} (\text{Floor}\,(\text{ref\_y}/128)*16 + \text{Floor}\,(\text{ref\_x}/64)) < \\ (\text{Floor}\,(\text{cur\_y}/128)*16 + \text{Floor}\,(\text{cur\_x}/64) - 4 \\ \text{Floor}\,(\text{ref\_y}/128) <= \text{Floor}\,(\text{cur\_y}/128) \\ \text{Floor}\,(\text{ref\_x}/64) < \text{Floor}\,(\text{cur\_x}/64) - \\ \quad 4 + (4+2)*\text{Floor}\,(\text{cur\_y}/64\,\text{ref\_y}/64) \end{cases}$$

(8), where (ref_x, ref_y) represents the coordinates of the coded data block in the multimedia data frame, (cur_x, cur_y) represents the coordinates of the data block to be coded in the multimedia data frame, and Floor( ) represents rounding down.

The first position information refers to the coordinates of the coded data block in the multimedia data frame, and the second position information refers to the coordinates of the data block to be coded in the multimedia data frame; in a case that the coding mode of the multimedia data frame is a parallel coding mode or a serial coding mode, the size of the SB is 64×64, the width and height of the tile are 1024 and 720 respectively, and the values of W and H are equal to 64; and when the restriction distance of spaced data blocks between the coded data block and the data block to be coded under the writing-back restriction conditions is 4 and the restriction distance of spaced data blocks between the coded data block and the data block to be coded under the coding processing conditions is 1, the second reference data block in the global reference data block set is a coded data block belonging to a same tile as the data block to be coded and having coordinates meeting the following Formula (9):

$$\begin{cases} (\text{Floor}(\text{ref\_y}/64)*16 + \text{Floor}(\text{ref\_x}/64)) < \\ (\text{Floor}(\text{cur\_y}/64)*16 + \text{Floor}(\text{cur\_x}/64)) - 4 \\ \text{Floor}(\text{ref\_y}/64) <= \text{Floor}(\text{cur\_y}/64) \\ \text{Floor}(\text{ref\_x}/64) < \text{Floor}(\text{cur\_x}/64) - 4 + \\ (4+1)*\text{Floor}(\text{cur\_y}/64 - \text{ref\_y}/64) \end{cases}$$

(9), where (ref_x, ref_y) represents the coordinates of the coded data block in the multimedia data frame, (cur_x, cur_y) represents the coordinates of the data block to be coded in the multimedia data frame, and Floor( ) represents rounding down.

As an example, in a case that the coding mode of the multimedia data frame is a parallel coding mode or a serial coding mode, the computer device may also obtain a global reference data block set by: determining the number of spaced data blocks between the coded data block and the data block to be coded according to the first position information, the second position information and the size information of the SB, and determining the target restricted number of spaced data blocks between the coded data block and the data block to be coded under the writing-back delay conditions and coding processing conditions, the target restricted number of spaced data blocks referring to the minimum number of spaced data blocks between the coded data block and the data block to be coded in a case that the writing-back delay conditions and coding processing conditions are met; using the coded data block belonging to a same tile as the data block to be coded in the multimedia data frame and having the number of spaced data blocks greater than the target restricted number of spaced data blocks as a second reference data block; and adding the second reference data block to the global reference data block set.

In some embodiments, the computer device may select one of the following two modes or a combination mode to obtain a local reference data block set.

Mode 1: The local reference data block set includes at least one third reference data block; and the third reference data block in the local reference data block set is a coded data block located in a same coding processing unit as the data block to be coded in the multimedia data frame. The coding processing unit may also be called a basic unit of an on-chip memory (VPDU, Virtual Pipeline Data Units), and the size information of the VPDU may be determined according to the coding processing capacity of a coder. For example, the size of the VPDU is VPDU_W×VPDU_H, and the values of VPDU_W and VPDU_H may be 4, 8, 16, 32, 64, 128, and the like. In other words, the coded data block having coordinates meeting ref_x/VPDU_W=cur_x/VPDU_W and ref_y/VPDU_H=cur_y/VPDU_H in the multimedia data frame is used as a second reference data block. For another example, if the size of the VPDU is 64×64, the coded data block in the VPDU 64×64 to which the data block to be coded belongs may be used as a reference data block of the data block to be coded. Alternatively, if the size of the VPDU is 64×64, the coded data block having coordinates meeting Floor(ref_x/64)=Floor(cur_x/64) and Floor(ref_y/64)=Floor(cur_y/64) in the multimedia data frame is used as a second reference data block.

Mode 2: The local reference data block set includes at least one fourth reference data block; and the fourth reference data block in the local reference data block set is a coded data block having an adjacent relationship with the data block to be coded in the multimedia data frame and belonging to a same tile as the data block to be coded. The adjacent relationship between the fourth reference data block and the data block to be coded may include at least one of the following three cases.

a: The adjacent relationship between the fourth reference data block and the data block to be coded means that: the fourth reference data block and the data block to be coded belong to a same SB.

b: The adjacent relationship between the fourth reference data block and the data block to be coded means that: the fourth reference data block is located in N SBs adjacent to the data block to be coded, and the size of the SB is less than a size threshold; and N is determined according to the size information of the SB. For example, the coding direction of the multimedia data frame is from left to right, and a size threshold may be set according to application scenes dynamically or user requirements. If the size threshold is 128×128, the adjacent relationship between the fourth reference data block and the data block to be coded means that: The fourth reference data block is located in N SBs on the left side of the data block to be coded, and the size of the SB is less than 128×128. N may be determined according to the following Formula (10):

$$\begin{cases} \text{log2\_sb\_size} = \log2(\text{sb\_size}) \\ N = (1 \ll ((7 - \text{log2\_sb\_size}) \ll 1)) - \\ (((\text{log2\_sb\_size}) < 7)?1:0) \end{cases} \quad (10)$$

where log2_sb_size refers to an intermediate variable, and sb_size refers to a size of the SB.

c: The adjacent relationship between the fourth reference data block and the data block to be coded means that: the fourth reference data block is located in N SBs adjacent to the data block to be coded, and the size of the SB is not less than a size threshold; a data block at an upper left corner of a target region is a data block that is not reconstructed, and the target region is a region where the fourth reference data block in the multimedia data frame moves to the right by one SB; the position information in a case that the fourth reference data block moves (the moving direction is the same as the coding direction) by a distance of one SB is different from the position information of the data block to be coded; and N is determined according to the size information of the SB. When the size of the SB is not less than a size threshold, for example, if the size of the SB is 128×128, the fourth reference data block needs to meet the following three conditions: 1. The fourth reference data block is a coded data block belonging to a same tile as the data block to be coded. 2. The coordinates of the fourth reference data block after moving to the right by 128 pixels are (ref_x+128, ref_y), and then, the data block having coordinates (ref_x+128, ref_y) in the multimedia data frame is a data block that is not reconstructed. 3. The position information in a case that the fourth reference data block moves to the right by a distance of one SB is different from the position information of the data block to be coded. This condition may be represented by Formula (11):

$$\begin{cases} \text{cur\_x}! = \text{Floor}\,((\text{ref\_x} + 128)/64) * 64 \\ \text{cur\_y}! = \text{Floor}\,(\text{ref\_y}/64) * 64 \end{cases} \quad (11)$$

where in Formula (11), !=represents not equal to.

In some embodiments, the distance between the first reference data block, the second reference data block, the third reference data block and the fourth reference data block and the data block to be coded is less than a second distance threshold; the second distance threshold may be set according to application scenes or user requirements dynamically, for example, the second distance threshold may be $2^{14}$; and furthermore, the first reference data block, the second reference data block, the third reference data block and the fourth reference data block are located in complete pixel positions of the multimedia data frame, which represents that the pixels included in these data blocks are complete pixels, and there is no case that one pixel is located in multiple data blocks.

Figure 8:
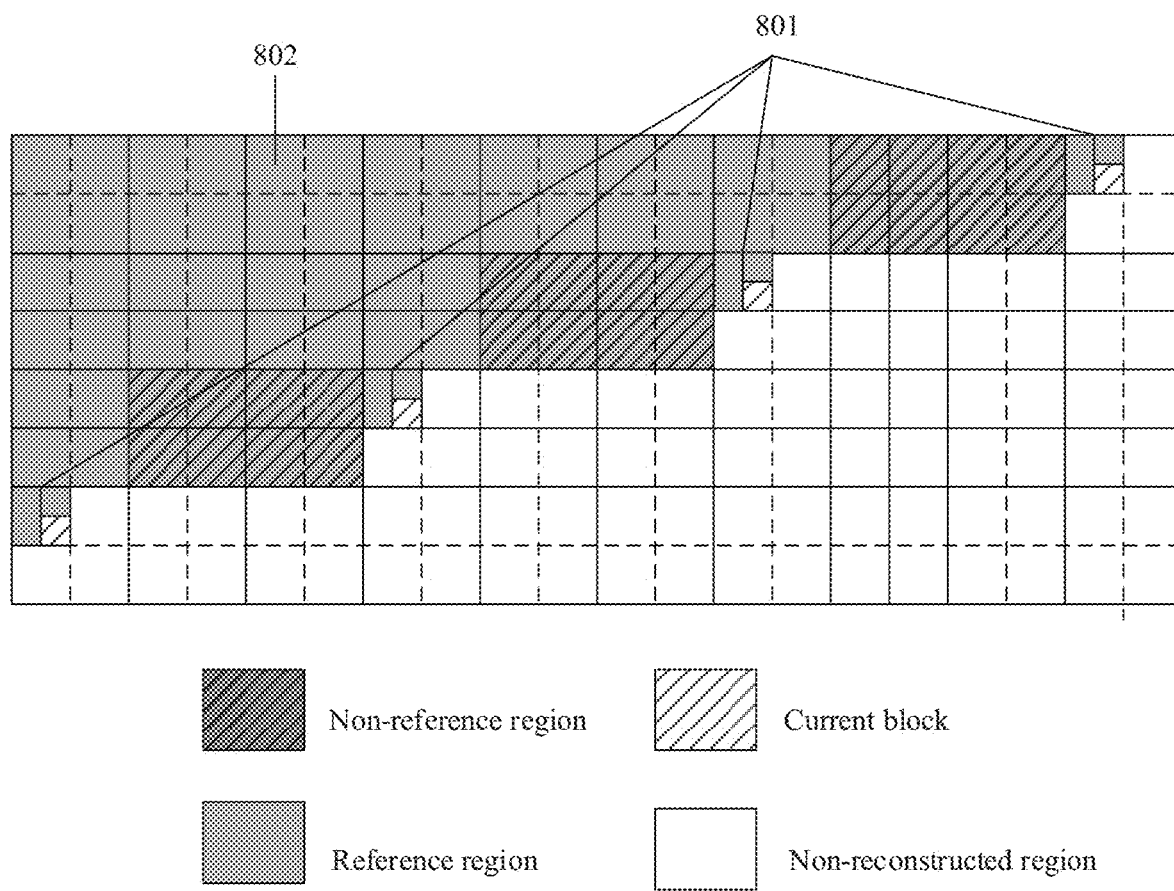
FIG. 8 is a schematic diagram showing the position relationship among a global reference data block set, a local reference data block set and data blocks to be coded provided in an embodiment of the present disclosure.

For example, in a case that the coding mode of the multimedia data frame is a parallel coding mode, the size of the SB is 128×128, the restricted number of spaced data blocks between the coded data block and the data block to be coded under writing-back delay restriction conditions is 4, the restricted number of spaced data blocks between the coded data block and the data block to be coded under coding processing conditions is 2, the mode of obtaining the local reference data block set is one of the foregoing modes, and the size of the VPDU is 64×64, the relationship among the global reference data block set, the local reference data block set and the data block to be coded is shown in FIG. 8. The size of a smallest square (that is, a small square drawn by dotted lines) in FIG. 8 is 64×64, the size of a small square drawn by solid lines is 128×128, and the size of a data block is 32×32. Therefore, the coded data block in the 19th square in the first row in the multimedia data frame in FIG. 8 belongs to a local reference data block set 801, and the local reference data block set is used for coding the data block to be coded in the 19th square in the first row. The coded data blocks in the first and second rows in the multimedia data frame that are 8 data blocks apart from the data block to be coded belong to a global reference data block set 802, and the global reference data block set is used for coding the data block to be coded in the 19th square in the first row. It can be seen from FIG. 8 that the number of reference data blocks in the global reference data block set is larger than the number of reference data blocks in the local reference data block set, the reference data block in the global reference data block set and the data block to be coded have no adjacent relationship, and the data block in the local reference data block set and the data block to be coded have an adjacent relationship.

Figure 9:
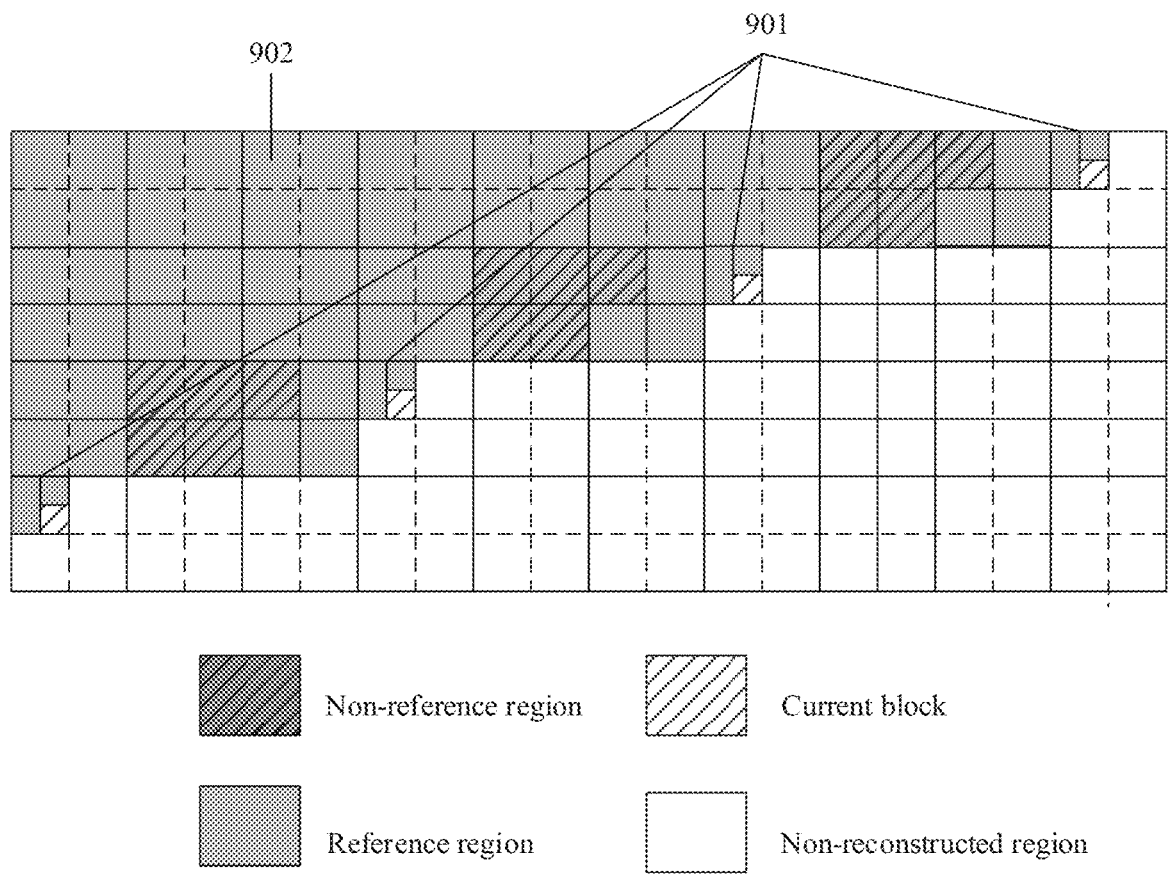
FIG. 9 is a schematic diagram showing the position relationship among a global reference data block set, a local reference data block set and data blocks to be coded provided in an embodiment of the present disclosure.

For example, in a case that the coding mode of the multimedia data frame is a parallel coding mode, the size of the SB is 128×128, the restricted number of spaced data blocks between the coded data block and the data block to be coded under writing-back delay restriction conditions is 4, the restricted number of spaced data blocks between the coded data block and the data block to be coded under coding processing conditions is 2, the mode of obtaining the local reference data block set is the foregoing mode 2, and the size of the VPDU is 64×64, the relationship among the global reference data block set, the local reference data block set and the data block to be coded is shown in FIG. 9. The size of a smallest square (that is, a small square drawn by dotted lines) in FIG. 9 is 64×64, the size of a small square drawn by solid lines is 128×128, and the size of a data block is 32×32. Therefore, the coded data block in the 19th square in the first row in the multimedia data frame in FIG. 9 and the coded data block in the SB on the left of the data block to be coded belong to a local reference data block set 901, and the local reference data block set is used for coding the data block to be coded in the 19th square in the first row. The coded data blocks in the first and second rows in the multimedia data frame that are 8 data blocks apart from the data block to be coded belong to a global reference data block set 902, and the global reference data block set is used for coding the data block to be coded in the 19th square in the first row. It can be seen from FIG. 9 that the number of reference data blocks in the global reference data block set is larger than the number of reference data blocks in the local reference data block set, the reference data block in the global reference data block set and the data block to be coded have no adjacent relationship, and the data block in the local reference data block set and the data block to be coded have an adjacent relationship.

In some embodiments, for any multimedia data frame, the computer device may determine a reference data block for coding the data block to be coded from the global reference data block set and the local reference data block set. Alternatively, the computer device may adaptively select a reference data block set according to the coding mode of the data block to be coded, so as to determine a reference data block for coding the data block to be coded from the selected reference data block set. Specifically, the computer device may obtain a coding mode of the data block to be coded; and determine a reference data block for predictive coding of the data block to be coded from the global reference data block set and the local reference data block set in a case that the coding mode of the data block to be coded is an IBC mode or an ISC mode. The coding mode of the data block to be coded may be determined according to a media type of the multimedia data frame, or the coding mode of the data block to be coded may be determined according to a coding mark (or reference mark) of the multimedia data frame. The coding mode of the data block to be coded may refer to a prediction mode of the data block to be coded.

In some embodiments, the determining a reference data block for predictive coding of the data block to be coded from the global reference data block set and the local reference data block set in a case that the coding mode of the data block to be coded is an IBC mode or an ISC mode includes: in a case that the coding mode of the data block to be coded is an IBC mode or an ISC mode, since the local reference data block and the data block to be coded have an adjacent relationship and the correlation between the second reference data block in the local reference data block set and the data block to be coded is relatively strong, the computer device may preferentially search the local reference data block set. If a reference data block meeting the conditions is searched in the local reference data block set, it is not necessary to search the global reference data block set, and if a reference data block meeting the conditions is not searched in the local reference data block set, the global reference data block set is searched, thereby being favorable for improving the efficiency of searching reference data blocks and avoiding unnecessary resource waste. For example, first, the computer device may obtain the pixel difference between the second reference data block in the local reference data block set and the data block to be coded. The pixel difference may refer to the sum of the mean square error or absolute difference between the pixel of the second reference data block and the pixel of the data block to be coded. In a case that there is a target data block with pixel difference less than a pixel difference threshold in the local reference data block set, it indicates that the target data block and the data block to be coded have a relatively strong correlation, so the target data block is used as a reference data block for predictive coding of the data block to be coded. In a case that there is no target data block with pixel difference less than a pixel difference threshold in the local reference data block set, it indicates that the correlation between the second reference data block in the local reference data block set and the data block to be coded is relatively weak, so a reference data block for predictive coding of the data block to be coded is determined from the global reference data block set.

In some embodiments, the determining a reference data block for predictive coding of the data block to be coded from the global reference data block set and the local reference data block set in a case that the coding mode of the data block to be coded is an IBC mode or an ISC mode includes: in a case that the coding mode of the data block to be coded is an IBC mode or an ISC mode, the computer device may determine a reference data block according to a target coded data block having a spatial adjacent relationship with the data block to be coded. Herein, the target coded data block having a spatial adjacent relationship may refer to all coded data blocks having a position adjacent relationship with the data block to be coded, or the target coded data block having a spatial adjacent relationship may refer to a coded data block having a position adjacent relationship with the data block to be coded and having a strong correlation with the pixel of the data block to be coded. Specifically, the computer device may obtain a target coded data block having a spatial adjacent relationship with the data block to be coded; and finely search regions corresponding to the global reference data block set and the local reference data block set according to moving parameters in a case that the reference data block of the target coded data block belongs to the global reference data block set and the local reference data block set, so as to obtain a reference data block for predictive coding of the data block to be coded. At this time, the reference data block of the data block to be coded belongs to the global reference data block set or the local reference data block set. Alternatively, the first region of the reference data block of the data block to be coded belongs to the global reference data block set, the second region of the reference data block of the data block to be coded belongs to the local reference data block set, and the data block where the first region is located has a position adjacent relationship with the data block where the second region is located. The reference data block is searched according to a moving parameter, which is favorable for searching an optimal reference data block to improve the coding performance. In a case that the reference data blocks of the target coded data block all belong to the global reference data block set, the local reference data block set is omitted, and the region corresponding to the global reference data block set is finely searched according to moving parameters to obtain a reference data block for predictive coding of the data block to be coded. In a case that the reference data blocks of the target coded data block all belong to the local reference data block set, the global reference data block set is omitted, and the region corresponding to the local reference data block set is finely searched according to moving parameters to obtain a reference data block for predictive coding of the data block to be coded.

The moving parameters include a moving window and a moving operation length, the size of the moving window is the same as the size of the data block to be coded, and the moving operation length is less than the width of the moving window.

Figure 10:
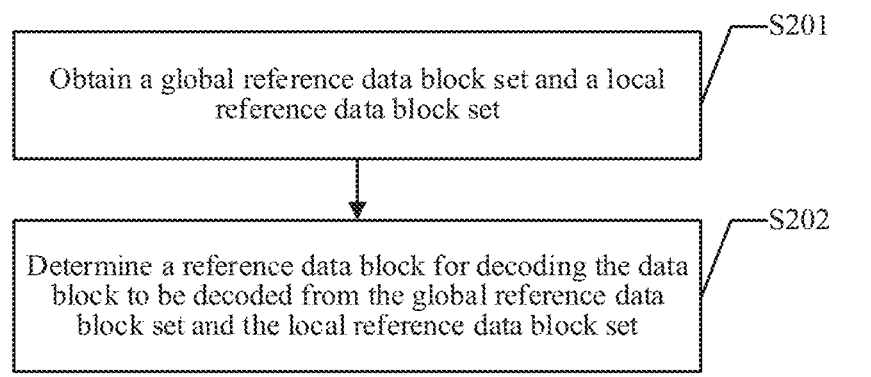
FIG. 10 is a schematic flow diagram of a multimedia data processing method provided in an embodiment of the present disclosure.

Referring to FIG. 10, FIG. 10 is a schematic flow diagram of a multimedia data processing method provided in an embodiment of the present disclosure. As shown in FIG. 10, the method may at least include S201 to S202.

S201: Obtain a global reference data block set and a local reference data block set. The global reference data block set and the local reference data block set are associated with a data block to be decoded in a multimedia data frame, the global reference data block set includes a decoded data block having no adjacent relationship with the data block to be decoded in the multimedia data frame, and the local reference data block set includes a decoded data block having an adjacent relationship with the data block to be decoded in the multimedia data frame.

Through the embodiment of the present disclosure, the computer device may obtain a multimedia data frame. The multimedia data frame may be shot by the computer device, or the multimedia data frame may be downloaded from the network by the computer device. The multimedia data frame refers to a video frame to be decoded in video data or one frame of image to be decoded in image data. The video data may refer to live video data, film and television video data, daily life video data, road monitoring video data, and the like. The image data may refer to person image data, building image data, object image data, and the like. The computer device may obtain a global reference data block set associated with the multimedia data frame according to at least one of the information, such as a decoding mode, a writing-back delay and a correlation between the decoded data block and the data block to be decoded, and may obtain a global reference data block set and a local reference data block set associated with the multimedia data frame according to at least one of the information, such as a size of a storage space for storing the local reference data block set and a correlation between the decoded data block and the data block to be decoded.

The global reference data block set and the local reference data block set are respectively stored in a first storage space and a second storage space. The first storage space and the second storage space may be located in a same computer device or in different computer devices. The first storage space and the second storage space may specifically refer to magnetic disks, storage medium arrays, or the like, which are not limited in the embodiment of the present disclosure. When the first storage space and the second storage space are located in a same computer device, the first storage space may refer to an off-chip memory of the computer device, and the second storage space may refer to an on-chip memory of the computer device; alternatively, the first storage space may refer to an on-chip memory of the computer device, and the second storage space may refer to an off-chip memory of the computer device. This is not limited in the embodiment of the present disclosure.

S202: Determine a reference data block for decoding the data block to be decoded from the local reference data block set and the global reference data block set.

Through the embodiments of the present disclosure, the computer device may adaptively select a reference data block from the global reference data block set and the local reference data block set according to application scenes or user requirements, so as to perform decoding of the data block to be decoded in the multimedia data frame according to the reference data block. As a result, the selection scope of reference data blocks is extended, and the decoding performance of multimedia data frames may be improved.

For example, the computer device may obtain attribute information of the data block to be decoded, and determine a reference data block for decoding the data block to be decoded from the local reference data block set and the global reference data block set according to the attribute information of the data block to be decoded. The attribute information of the data block to be decoded includes at least one of the following: a media type of the multimedia data frame to which the data block to be decoded belongs, a reference mark of the multimedia data frame, and a definition of the multimedia data frame to which the data block to be decoded belongs. The media type includes an intra-frame type and an inter-frame type. The intra-frame type may refer to a representative multimedia data frame. The intra-frame type is a full intra-decoded frame, such as an Intra frame, an I frame and a key frame. This type of frame only allows the use of an intra-frame decoding technology, and does not need to rely on other frames for decoding. For example, the intra-frame type may refer to a multimedia data frame that may reflect the main meaning in video data or image data. The inter-frame type may refer to multimedia data frames in video data or image data other than the intra-frame type. The inter-frame type may be called an inter-decoded frame, such as a P frame, a B frame and a non-key frame. This type of frame allows the use of an inter-frame decoding technology and an intra-frame decoding technology. Generally, when the inter-frame decoding technology is used, the decoding may be performed after the reference frame decoding is completed. The reference mark of the multimedia data frame is used for reflecting the selection scope of the reference data block of the data block to be decoded (that is, which reference data block set is selected).

Through the embodiments of the present disclosure, the computer device may obtain the global reference data block set and the local reference data block set, which is beneficial to adaptively select a reference data block from the global reference data block set and the local reference data block set according to application scenes or user requirements, so as to perform decoding of the data block to be decoded in the multimedia data frame according to the reference data block. As a result, the selection scope of reference data blocks is extended, and the decoding performance of multimedia data frames may be improved.

In some embodiments, the computer device may select one of the following two modes according to the decoding mode of the multimedia data frame to obtain a global reference data block set.

Mode 1: The global data block set includes at least one first reference data block; in a case that the decoding mode of the multimedia data frame is a serial decoding mode, the first reference data block in the global reference data block set is a decoded data block having a parameter association relationship meeting writing-back restriction conditions in the multimedia data frame and belonging to a same decoding chip as the data block to be decoded; the parameter association relationship is used for reflecting the association relationship between the first position information and the second position information and the association relationship between the first position information and the size information of a largest decoding block, the first position information refers to the position information of the decoded data block in the multimedia data frame, and the second position information refers to the position information of the data block to be decoded in the multimedia data frame; and the writing-back restriction conditions are used for reflecting the restricted delay of writing the decoded data block to the global reference data block set. In other words, the serial decoding mode means that only one data block in the multimedia data frame is decoded at the same time. In a case that the decoding mode of the multimedia data frame is a serial decoding mode, this decoding mode will not affect the determination process of the reference data block. However, writing the decoded data block to the global reference data block set will cause a larger writing-back delay, that is, writing the decoded data block to the global reference data block set will take a longer time. Therefore, the decoded data block may only be used as a reference data block after waiting at least a preset time. The preset time is determined according to the restricted delay of writing the decoded data block to the global reference data block set. The restricted delay may refer to one of an average delay, a maximum delay and a minimum delay of writing the decoded data block to the global reference data block set. Therefore, in a case that the decoding mode of the multimedia data frame is a serial decoding mode, the first reference data block in the global reference data block set needs to meet the following two conditions: a: belonging to a same decoding chip as the data block to be decoded; and b: having a parameter association relationship meeting writing-back restriction conditions.

Mode 2: The global data block set includes at least one second reference data block; in a case that the decoding mode of the multimedia data frame is a parallel decoding mode or a serial decoding mode, the second reference data block in the global reference data block set is a decoded data block belonging to a same decoding chip as the data block to be decoded and having a parameter association relationship meeting writing-back restriction conditions in the multimedia data frame and meeting decoding processing conditions; the parameter association relationship is used for reflecting the association relationship among the position information of the decoded data block in the multimedia data frame, the position information of the data block to be decoded in the multimedia data frame, and the size information of the largest decoding block; and the writing-back restriction conditions are used for reflecting the restricted delay of writing the decoded data block to the global reference data block set. The parallel decoding mode means that multiple data blocks in the multimedia data frame are predictively decoded at the same time. In a case that the decoding mode of the multimedia data frame is a parallel decoding mode, this decoding mode will affect the determination process of the reference data block. Furthermore, writing the decoded data block to the global reference data block set will cause a larger writing-back delay. Therefore, in a case that the decoding mode of the multimedia data frame is a parallel decoding mode, the second reference data block in the global reference data block set needs to meet the following three conditions: a: belonging to a same decoding chip as the data block to be decoded; b: having a parameter association relationship meeting writing-back restriction conditions; and c: having the parameter association relationship meeting decoding processing conditions. In particular, in a case that the decoding mode of the multimedia data frame is a serial decoding mode, a global reference data block set may also be obtained in the mode 2. Herein, the decoding processing conditions may refer to parallel decoding processing conditions.

The specific mode of obtaining the global reference data block set may refer to the mode of obtaining the global reference data block set at the coding side, which will not be repeated here.

In some embodiments, the adjacent relationship between the data block to be coded and the coded data block may mean that the coding order of the data block to be coded is adjacent to the coding order of the coded data block; and no adjacent relationship between the data block to be coded and the coded data block may mean that the coding order of the data block to be coded is not adjacent to the coding order of the coded data block.

In some embodiments, the computer device may select one of the following two modes or a combination mode to obtain a local reference data block set.

Mode 1: The local data block set includes at least one third reference data block; and the third reference data block in the local reference data block set is a decoded data block located in a same decoding processing unit as the data block to be decoded in the multimedia data frame. The decoding processing unit may also be called a basic unit of an on-chip memory (VPDU, Virtual Pipeline Data Units), and the size information of the VPDU may be determined according to the decoding processing capacity of a decoder. For example, the size of the VPDU is VPDU_W×VPDU_H, and the values of VPDU_W and VPDU_H may be 4, 8, 16, 32, 64, 128, and the like. In other words, the decoded data block having coordinates meeting ref_x/VPDU_W=cur_x/VPDU_W and ref_y/VPDU_H=cur_y/VPDU_H in the multimedia data frame is used as a third reference data block. For another example, if the size of the VPDU is 64×64, the decoded data block in the VPDU 64×64 to which the data block to be decoded belongs may be used as a reference data block of the data block to be decoded. Alternatively, if the size of the VPDU is 64×64, the decoded data block having coordinates meeting Floor(ref_x/64)=Floor(cur_x/64) and Floor(ref_y/64)=Floor(cur_y/64) in the multimedia data frame is used as a third reference data block.

Mode 2: The local data block set includes at least one fourth reference data block; and the fourth reference data block in the local reference data block set is a decoded data block having an adjacent relationship with the data block to be decoded in the multimedia data frame and belonging to a same decoding chip as the data block to be decoded. The adjacent relationship between the fourth reference data block and the data block to be decoded may include one or a combination of the following three cases.

a: The adjacent relationship between the fourth reference data block and the data block to be decoded means that: the fourth reference data block and the data block to be decoded belong to a same largest decoding block.

b: The adjacent relationship between the fourth reference data block and the data block to be decoded means that: the fourth reference data block is located in N largest decoding blocks adjacent to the data block to be decoded, and the size of the largest decoding block is less than a size threshold; and N is determined according to the size information of the largest decoding block.

The size of the SB is the same as the size of the largest decoding block, the size of the data block to be coded is the same as the size of the data block to be decoded, and the size of the tile is the same as the size of the decoding chip.

In some embodiments, the distance between the first reference data block, the second reference data block, the third reference data block and the fourth reference data block and the data block to be decoded is less than a second distance threshold; the second distance threshold may be set according to application scenes or user requirements dynamically, for example, the second distance threshold may be $2^{14}$; and furthermore, the first reference data block, the second reference data block, the third reference data block and the fourth reference data block are located in complete pixel positions of the multimedia data frame.

In some embodiments, for any multimedia data frame, the computer device may determine a reference data block for decoding the data block to be decoded from the global reference data block set and the local reference data block set. Alternatively, the computer device may adaptively select a reference data block set according to the decoding mode of the data block to be decoded, so as to determine a reference data block for decoding the data block to be decoded from the selected reference data block set. Specifically, the computer device may obtain a decoding mode of the data block to be decoded; and determine a reference data block for decoding the data block to be decoded from the global reference data block set and the local reference data block set in a case that the decoding mode of the data block to be decoded is an IBC mode or an ISC mode. The decoding mode of the data block to be decoded may be determined according to a media type of the multimedia data frame, or the decoding mode of the data block to be decoded may be determined according to a decoding mark (or reference mark) of the multimedia data frame. In particular, the decoding mode of the data block to be decoded may refer to a prediction mode of the data block to be decoded.

Figure 11:
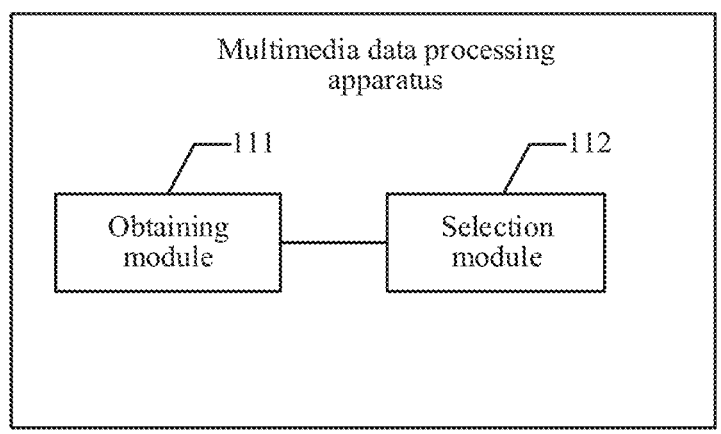
FIG. 11 is a schematic structural diagram of a multimedia data processing apparatus provided in an embodiment of the present disclosure.

Referring to FIG. 11, FIG. 11 is a schematic structural diagram of a multimedia data processing apparatus provided in an embodiment of the present disclosure. The multimedia data processing apparatus may be a computer program (including program codes) running in a computer device. For example, the multimedia data processing apparatus is an application software. The apparatus may be configured to perform the corresponding operations in the methods provided in the embodiments of the present disclosure.

As shown in FIG. 11, the multimedia data processing apparatus may include: an obtaining module 111 and a selection module 112. The obtaining module is configured to obtain a global reference data block set and a local reference data block set, the global reference data block set and the local reference data block set being associated with a data block to be coded in a multimedia data frame, the global reference data block set including a coded data block having no adjacent relationship with the data block to be coded in the multimedia data frame, and the local reference data block set including a coded data block having an adjacent relationship with the data block to be coded in the multimedia data frame. The selection module is configured to determine a reference data block for predictive coding of the data block to be coded from the global reference data block set and the local reference data block set.

In some embodiments, the selection module is further configured to: obtain a coding mode of the data block to be coded; and determine a reference data block for predictive coding of the data block to be coded from the global reference data block set and the local reference data block set in a case that the coding mode of the data block to be coded is an IBC mode or an ISC mode.

In some embodiments, the selection module is further configured to: obtain the pixel difference between a second reference data block in the local reference data block set and the data block to be coded in a case that the coding mode of the data block to be coded is an IBC mode or an ISC mode; take the target data block as a reference data block for predictive coding of the data block to be coded in a case that there is a target data block with pixel difference less than a pixel difference threshold in the local reference data block set; and determine a reference data block for predictive coding of the data block to be coded from the global reference data block set in a case that there is no target data block with pixel difference less than the pixel difference threshold in the local reference data block set.

In some embodiments, the selection module is further configured to: obtain a target coded data block having a spatial adjacent relationship with the data block to be coded in a case that the coding mode of the data block to be coded is an IBC mode or an ISC mode; and search regions corresponding to the global reference data block set and the local reference data block set according to moving parameters in a case that the reference data block of the target coded data block belongs to the global reference data block set and the local reference data block set, so as to obtain a reference data block for predictive coding of the data block to be coded, the moving parameters including a moving window and a moving step length, the size of the moving window being the same as the size of the data block to be coded, and the moving step length being less than the width of the moving window.

In some embodiments, the global reference data block set includes at least one first reference data block; in a case that the coding mode of the multimedia data frame is a serial coding mode, the first reference data block in the global reference data block set is a coded data block having a parameter association relationship meeting writing-back restriction conditions in the multimedia data frame and belonging to a same tile as the data block to be coded; the parameter association relationship is used for reflecting the association relationship between the first position information and the size information of the SB and the association relationship between the first position information and the second position information, and the first position information and the second position information refer to the position information of the coded data block and the data block to be coded in the multimedia data frame respectively; and the writing-back restriction conditions are used for reflecting the restricted delay of writing the coded data block to the global reference data block set.

In some embodiments, the obtaining module is further configured to respectively obtain the first position information, the size information of the SB and the second position information in a case that the coding mode of the multimedia data frame is a serial coding mode, the first position information referring to the position information of the coded data block in the multimedia data frame, and the second position information referring to the position information of the data block to be coded in the multimedia data frame; obtain writing-back restriction conditions, the writing-back restriction conditions being used for reflecting the restricted delay of writing the coded data block to the global reference data block set; select a coded data block having a parameter association relationship meeting the writing-back restriction conditions and belonging to a same tile as the data block to be coded from the multimedia data frame as a first reference data block, the parameter association relationship being used for reflecting the association relationship between the first position information and the second position information and the association relationship between the first position information and the size information of the SB; and add the first reference data block to the global reference data block set.

In some embodiments, the obtaining module is further configured to: select a coded data block belonging to a same tile as the data block to be coded from the multimedia data frame as a first candidate reference data block according to the first position information and the second position information; determine the restricted number of spaced data blocks between the coded data block and the data block to be coded in the multimedia data frame under the writing-back restriction conditions; count the number of spaced data blocks between the first candidate reference data block and the data block to be coded according to the first position information, the size information of the SB and the second position information; and determine the first candidate reference data block with the number of spaced data blocks greater than the restricted number of spaced data blocks as a first reference data block.

In some embodiments, the obtaining module is further configured to: determine a row identifier and a column identifier of the first candidate reference data block according to the first position information and the size information of the SB; determine a row identifier and a column identifier of the data block to be coded according to the second position information and the size information of the SB; determine the number of data blocks in each row in the multimedia data frame based on the size information of the data block to be coded; and count the number of spaced data blocks between the first candidate reference data block and the data block to be coded according to the number of data blocks in each row, the row identifier and column identifier of the first candidate reference data block, and the row identifier and column identifier of the data block to be coded.

In some embodiments, the global reference data block set includes at least one second reference data block; the second reference data block in the global reference data block set is a coded data block belonging to a same tile as the data block to be coded and having a parameter association relationship meeting writing-back restriction conditions in the multimedia data frame and meeting coding processing conditions; the parameter association relationship is used for reflecting the association relationship among the position information of the coded data block in the multimedia data frame, the position information of the data block to be coded in the multimedia data frame, and the size information of the SB; and the writing-back restriction conditions are used for reflecting the restricted delay of writing the coded data block to the global reference data block set.

In some embodiments, the obtaining module is further configured to respectively obtain the first position information, the size information of the SB and the second position information, the first position information referring to the position information of the coded data block in the multimedia data frame, and the second position information referring to the position information of the data block to be coded in the multimedia data frame; obtain writing-back restriction conditions and coding processing conditions, the writing-back restriction conditions being used for reflecting the restricted delay of writing the coded data block to the global reference data block set; select a coded data block having a parameter association relationship meeting the writing-back restriction conditions and coding processing conditions and belonging to a same tile as the data block to be coded from the multimedia data frame as a second reference data block, the parameter association relationship being used for reflecting the association relationship between the first position information and the second position information and the association relationship between the first position information and the size information of the data block to be coded; and add the second reference data block to the global reference data block set.

In some embodiments, the obtaining module is further configured to: select a coded data block belonging to a same tile as the data block to be coded from the multimedia data frame as a first candidate reference data block according to the first position information and the second position information; select a first candidate reference data block having a parameter association relationship meeting the writing-back restriction conditions from the first candidate reference data blocks as a second candidate reference data block; determine a first data block restriction distance between the coded data block and the data block to be coded in the multimedia data frame under the writing-back restriction conditions; determine a second data block restriction distance between the coded data block and the data block to be coded in the multimedia data frame under the coding processing conditions; and determine a second candidate reference data block meeting the coding processing conditions from the second candidate reference data blocks as a second reference data block according to the first position information, the size information of the SB, the second position information, the first data block restriction distance and the second data block restriction distance.

In some embodiments, the obtaining module is further configured to: determine a row identifier and a column identifier of the second candidate reference data block according to the first position information and the size information of the SB; determine a row identifier and a column identifier of the data block to be coded according to the second position information and the size information of the SB; select a second candidate reference data block with a row identifier not greater than the row identifier of the data block to be coded from the second candidate reference data blocks as a third candidate reference data block; determine a row distance between the third candidate reference data block and the data block to be coded according to the row identifier of the third candidate reference data block and the row identifier of the data block to be coded; determine a column distance between the third candidate reference data block and the data block to be coded according to the column identifier of the third candidate reference data block and the column identifier of the data block to be coded; and determine a third candidate reference data block with a column distance less than a first distance threshold in the third candidate reference data blocks as a second reference data block, the first distance threshold being determined according to the first data block restriction distance, the second data block restriction distance, and the row distance between the third candidate reference data block and the data block to be coded.

In some embodiments, the local reference data block set includes at least one third reference data block, and the third reference data block is a coded data block located in a same coding processing unit as the data block to be coded in the multimedia data frame.

In some embodiments, the local reference data block set includes at least one fourth reference data block, and the fourth reference data block is a coded data block having an adjacent relationship with the data block to be coded in the multimedia data frame and belonging to a same tile as the data block to be coded.

In some embodiments, the adjacent relationship between the fourth reference data block and the data block to be coded means that: the fourth reference data block and the data block to be coded belong to a same SB.

In some embodiments, the adjacent relationship between the fourth reference data block and the data block to be coded means that: the fourth reference data block is located in N SBs adjacent to the data block to be coded, and the size of the SB is not greater than a size threshold; and N is determined according to the size information of the SB.

In some embodiments, the adjacent relationship between the fourth reference data block and the data block to be coded means that: the fourth reference data block is located in N SBs adjacent to the data block to be coded, and the size of the SB is not less than a size threshold; a data block at an upper left corner of a target region is a data block that is not reconstructed, and the target region is a region where the fourth reference data block in the multimedia data frame moves to the right by one SB; the position information in a case that the fourth reference data block moves by a distance of one SB is different from the position information of the data block to be coded; and N is determined according to the size information of the SB.

In some embodiments, the distance between the first reference data block, the second reference data block, the third reference data block and the fourth reference data block and the data block to be coded is less than a second distance threshold; and the first reference data block, the second reference data block, the third reference data block and the fourth reference data block are located in complete pixel positions of the multimedia data frame.

In some embodiments, the operations in the data processing method shown in FIG. 7 may be performed by the modules in the data processing apparatus shown in FIG. 11. For example, operation S101 shown in FIG. 7 may be performed by the obtaining module 111 shown in FIG. 11, and operation S102 shown in FIG. 7 may be performed by the selection module 112 shown in FIG. 11.

In some embodiments, the modules in the multimedia data processing apparatus shown in FIG. 11 may be separately or wholly combined into at least one unit, or one (or more) of the units herein may further be divided into at least two subunits with smaller functions. In this way, same operations may be implemented, and the implementation of the technical effects of the embodiments of the present disclosure is not affected. The foregoing modules are divided based on logical functions. In practical applications, a function of one module may be implemented by at least two units, or functions of at least two modules may be implemented by one unit. In other embodiments of the present disclosure, the data processing apparatus may also include other units. In practical applications, these functions may also be cooperatively implemented by other units, and may be cooperatively implemented by at least two units.

In some embodiments, the multimedia data processing apparatus shown in FIG. 11 may be constructed and the data processing methods in the embodiments of the present disclosure may be implemented by running a computer program (including program codes) that may perform the operations of the corresponding methods as shown in FIG. 10 and FIG. 11 on a general computing device, such as a computer, which includes processing elements and storage elements such as a central processing unit (CPU), a random access memory (RAM), and a read-only memory (ROM). The foregoing computer program may be recorded in a computer-readable recording medium, and may be loaded into the foregoing computing device through the computer-readable recording medium, and run in the computing device.

Through the embodiments of the present disclosure, the computer device may obtain the global reference data block set and the local reference data block set, which is beneficial for a coding terminal to adaptively select a reference data block from the global reference data block set and the local reference data block set according to application scenes or user requirements, so as to perform predictive coding of the data block to be coded in the multimedia data frame according to the reference data block. As a result, the selection scope of reference data blocks is extended, and the coding performance of multimedia data frames may be improved.

Figure 12:
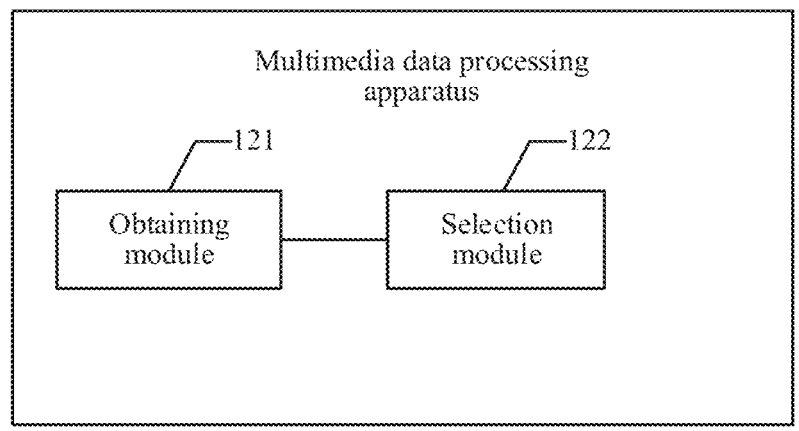
FIG. 12 is a schematic structural diagram of a multimedia data processing apparatus provided in an embodiment of the present disclosure.

Referring to FIG. 12, FIG. 12 is a schematic structural diagram of a multimedia data processing apparatus provided in an embodiment of the present disclosure. The multimedia data processing apparatus may be a computer program (including program codes) running in a computer device. For example, the multimedia data processing apparatus is an application software. The apparatus may be configured to perform the corresponding operations in the methods provided in the embodiments of the present disclosure. As shown in FIG. 12, the multimedia data processing apparatus may include: an obtaining module 121 and a selection module 122. The obtaining module is configured to obtain a global reference data block set and a local reference data block set, the global reference data block set and the local reference data block set being associated with a data block to be decoded in a multimedia data frame, the global reference data block set including a decoded data block having no adjacent relationship with the data block to be decoded in the multimedia data frame, and the local reference data block set including a decoded data block having an adjacent relationship with the data block to be decoded in the multimedia data frame. The selection module is configured to determine a reference data block for decoding the data block to be decoded from the global reference data block set and the local reference data block set.

In some embodiments, the selection module is further configured to: obtain a decoding mode of the data block to be decoded; and determine a reference data block for decoding the data block to be decoded from the global reference data block set and the local reference data block set in a case that the decoding mode of the data block to be decoded is an IBC mode or an ISC mode.

In some embodiments, the global reference data block set includes at least one first reference data block; in a case that the decoding mode of the multimedia data frame is a serial decoding mode, the first reference data block in the global reference data block set is a decoded data block having a parameter association relationship meeting writing-back restriction conditions in the multimedia data frame and belonging to a same decoding chip as the data block to be decoded; the parameter association relationship is used for reflecting the association relationship between the first position information and the second position information and the association relationship between the first position information and the size information of a largest decoding block, the first position information refers to the position information of the decoded data block in the multimedia data frame, and the second position information refers to the position information of the data block to be decoded in the multimedia data frame; and the writing-back restriction conditions are used for reflecting the restricted delay of writing the decoded data block to the global reference data block set.

In some embodiments, the global reference data block set includes at least one second reference data block; the second reference data block in the global reference data block set is a decoded data block belonging to a same decoding chip as the data block to be decoded and having a parameter association relationship meeting writing-back restriction conditions in the multimedia data frame and meeting decoding processing conditions; the parameter association relationship is used for reflecting the association relationship among the position information of the decoded data block in the multimedia data frame, the position information of the data block to be decoded in the multimedia data frame, and the size information of the largest decoding block; and the writing-back restriction conditions are used for reflecting the restricted delay of writing the decoded data block to the global reference data block set.

In some embodiments, the local reference data block set includes at least one third reference data block; and the third reference data block in the local reference data block set is a decoded data block located in a same decoding processing unit as the data block to be decoded in the multimedia data frame.

In some embodiments, the local reference data block set includes at least one fourth reference data block; and the fourth reference data block in the local reference data block set is a decoded data block having an adjacent relationship with the data block to be decoded in the multimedia data frame and belonging to a same decoding chip as the data block to be decoded.

In some embodiments, the operations in the data processing method shown in FIG. 10 may be performed by the modules in the data processing apparatus shown in FIG. 12. For example, operation S201 shown in FIG. 10 may be performed by the obtaining module 121 shown in FIG. 12, and operation S202 shown in FIG. 10 may be performed by the selection module 122 shown in FIG. 12.

In some embodiments, the modules in the multimedia data processing apparatus shown in FIG. 12 may be separately or wholly combined into at least one unit, or one (or more) of the units herein may further be divided into at least two subunits with smaller functions. In this way, same operations may be implemented, and the implementation of the technical effects of the embodiments of the present disclosure is not affected. The foregoing modules are divided based on logical functions. In practical applications, a function of one module may be implemented by at least two units, or functions of at least two modules may be implemented by one unit. In other embodiments of the present disclosure, the data processing apparatus may also include other units. In practical applications, these functions may also be cooperatively implemented by other units, and may be cooperatively implemented by at least two units.

In some embodiments, the multimedia data processing apparatus shown in FIG. 12 may be constructed and the data processing methods in the embodiments of the present disclosure may be implemented by running a computer program (including program codes) that may perform the operations of the corresponding methods as shown in FIG. 10 and FIG. 11 on a general computing device, such as a computer, which includes processing elements and storage elements such as a CPU, a RAM, and a ROM. The foregoing computer program may be recorded in a computer-readable recording medium, and may be loaded into the foregoing computing device through the computer-readable recording medium, and run in the computing device.

Through the embodiments of the present disclosure, the computer device may obtain the global reference data block set and the local reference data block set, which is beneficial to adaptively select a reference data block from the global reference data block set and the local reference data block set according to application scenes or user requirements, so as to perform predictive decoding of the data block to be decoded in the multimedia data frame according to the reference data block. As a result, the selection scope of reference data blocks is extended, and the decoding performance of multimedia data frames may be improved.

Figure 13:
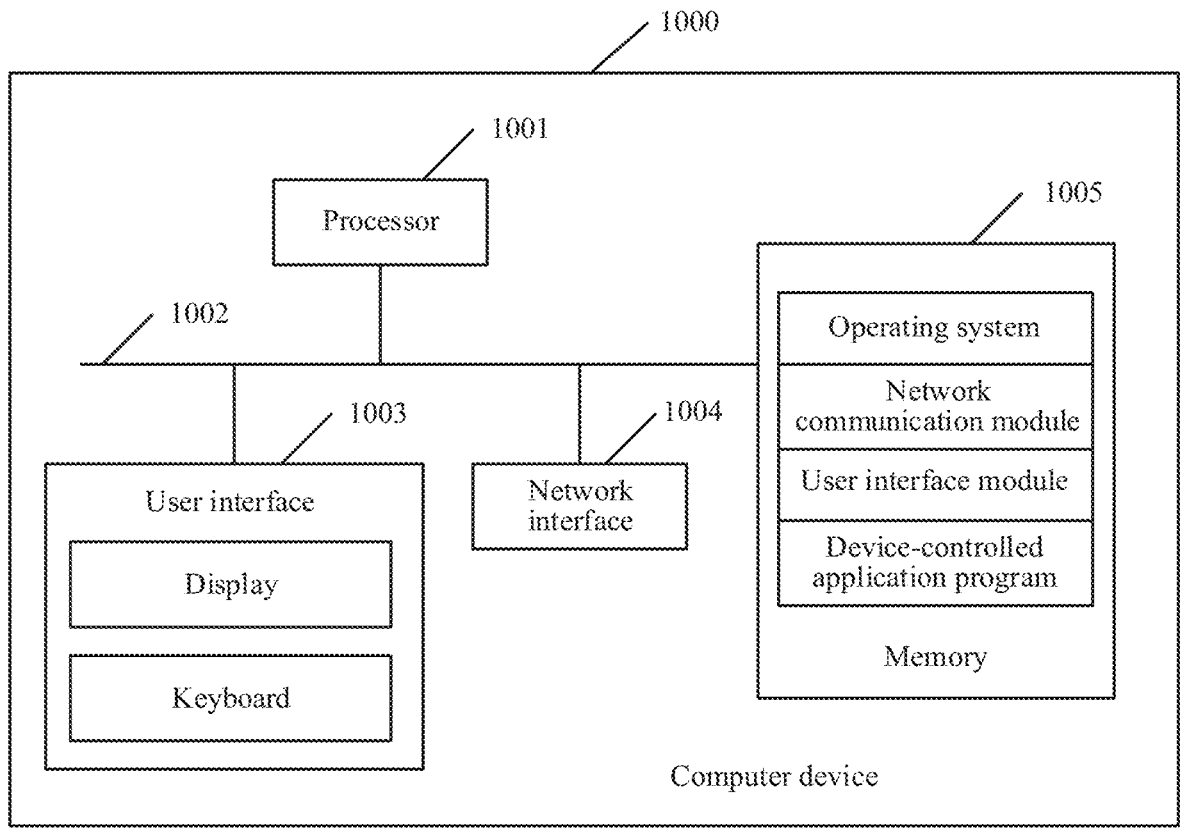
FIG. 13 is a schematic structural diagram of a computer device provided in an embodiment of the present disclosure.

Referring to FIG. 13, FIG. 13 is a schematic structural diagram of a computer device provided in an embodiment of the present disclosure. As shown in FIG. 13, the computer device 1000 may include: a processor 1001, a network interface 1004, and a memory 1005. Furthermore, the computer device 1000 may further include: a media content interface 1003 and at least one communication bus 1002. The communication bus 1002 is configured to implement the connection and communication between these components. The media content interface 1003 may include a display and a keyboard. Optionally, the media content interface 1003 may further include a standard wired interface and a standard wireless interface. In some embodiments, the network interface 1004 may include a standard wired interface and a standard wireless interface (for example, a WiFi interface). The memory 1005 may be a high-speed random access memory (RAM), or may be a non-volatile memory, for example, at least one magnetic disk storage. In some embodiments, the memory 1005 may further be at least one storage apparatus that is located far away from the processor 1001. As shown in FIG. 13, the memory 1005 used as a computer-readable storage medium may include an operating system, a network communication module, a media content interface module, and a device-controlled application program.

In the computer device 1000 shown in FIG. 13, the network interface 1004 may provide a network communication function; and the media content interface 1003 is mainly configured to provide an input interface for media content.

It is to be understood that the computer device 1000 described in the embodiments of the present disclosure may perform the description of the multimedia data processing methods in the embodiments corresponding to FIG. 7 to FIG. 10, and may also perform the description of the multimedia data processing apparatus in the embodiments corresponding to FIG. 11 and FIG. 12, which will not be repeated here. In addition, the descriptions of beneficial effects of the same method are not described herein again.

In addition, it is to be understood that: an embodiment of the present disclosure further provides a computer-readable storage medium, the computer-readable storage medium stores a computer program executed by the foregoing multimedia data processing apparatus, and the computer program includes program instructions. After executing the program instructions, the foregoing processor may perform the description of the multimedia data processing methods in the embodiments corresponding to FIG. 7 and FIG. 10, which will not be repeated here. In addition, the descriptions of beneficial effects of the same method are not described herein again. For technical details that are not disclosed in the embodiments of the computer-readable storage medium involved in the present disclosure, refer to the descriptions of the method embodiments of the present disclosure.

As an example, the foregoing program instructions may be executed on a computer device, on at least two computer devices at the same location, or on at least two computer devices that are distributed in at least two locations and interconnected through a communication network. The at least two computer devices that are distributed in the at least two locations and interconnected through the communication network may form a blockchain network.

The foregoing computer-readable storage medium may be a data processing apparatus provided in any of the foregoing embodiments or an internal storage unit of the foregoing computer device, such as a hard disk or a memory of the computer device. The computer-readable storage medium may also be an external storage device of the computer device, such as a plug-in hard disk, a smart media card (SMC), a secure digital (SD) card, a flash card, or the like, equipped on the computer device. Further, the computer-readable storage medium may also include both an internal storage unit of the computer device and an external storage device. The computer-readable storage medium is configured to store the computer program and other programs and data required by the computer device. The computer-readable storage medium may also be configured to temporarily store the data that has been outputted or will be outputted.

An embodiment of the present disclosure further provides a computer program product, including a computer program/instructions. After executing the computer program/instructions, a processor implements the description of the data processing methods in the embodiments corresponding to FIG. 7 and FIG. 10, which will not be repeated here. In addition, the descriptions of beneficial effects of the same method are not described herein again. For technical details that are not disclosed in the embodiments of the computer program product involved in the present disclosure, refer to the descriptions of the method embodiments of the present disclosure.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A method for processing multimedia data, the method being executed by at least one processor, the method comprising:
obtaining a global reference data block set and a local reference data block set, wherein the global reference data block set and the local reference data block set are associated with a first data block in a multimedia data frame, wherein the global reference data block set comprises a first coded data block being non-adjacent to the first data block, and wherein the local reference data block set comprises a second coded data block being adjacent to the first data block, wherein the global reference data block set and the local reference data block set are both adjacent to at least one non-reference data block set comprising at least one data block that is not referenceable by the first data block; and
determining a reference data block for coding or decoding of the first data block based on the global reference data block set and the local reference data block set.

2. The method according to claim 1, wherein the determining the reference data block comprises:
obtaining a coding mode of the first data block; and
determining, based on the coding mode of the first data block being an intra block copy (IBC) mode or an intra string copy (ISC) mode, the reference data block for coding or decoding of the first data block by using the global reference data block set and the local reference data block set.

3. The method according to claim 2, wherein the determining the reference data block based on the coding mode of the first data block comprises:

obtaining, based on the coding mode of the first data block being an IBC mode or an ISC mode, a pixel difference between one data block in the local reference data block set and the first data block;

based on a target data block having the pixel difference less than a pixel difference threshold in the local reference data block set, selecting the target data block as the reference data block; and based on the target data block having the pixel difference greater than or equal to the pixel difference threshold in the local reference data block set, determining the reference data block based on the global reference data block set.

4. The method according to claim 2, wherein the determining the reference data block based on the coding mode of the first data block comprises:

based on the coding mode of the first data block being an IBC mode or an ISC mode, obtaining a target coded data block that is spatially adjacent to the first data block; and obtaining the reference data block for coding or decoding of the first data block by searching regions corresponding to the global reference data block set and the local reference data block set is based on moving parameters based on a reference data block of the target coded data block belonging to the global reference data block set and the local reference data block set, wherein the moving parameters comprise a moving window and a moving step length, a size of the moving window being same as a size of the first data block, and the moving step length being less than a width of the moving window.

5. The method according to claim 4, wherein the global reference data block set comprises at least one first reference data block;

wherein, when a coding mode of the multimedia data frame is a serial coding mode, the at least one first reference data block is a coded data block having a parameter association relationship meeting one or more writing-back restriction conditions in the multimedia data frame and belonging to a same tile as the first data block;

wherein the parameter association relationship indicates a first association relationship between a first position information and a size information of a superblock (SB) and a second association relationship between the first position information and a second position information, the first position information being position information of the coded data block in the multimedia data frame, and the second position information being position information of the first data block in the multimedia data frame; and wherein, the one or more writing-back restriction conditions indicate a restricted delay of writing the coded data block to the global reference data block set.

6. The method according to claim 4, wherein the global reference data block set comprises at least one second reference data block;

wherein the at least one second reference data block is a coded data block belonging to a same tile as the first data block and having a parameter association relationship meeting one or more writing-back restriction conditions in the multimedia data frame and meeting one or more coding processing conditions;

wherein the parameter association relationship reflects a third association relationship between a position information of the coded data block in the multimedia data frame, a position information of the first data block in the multimedia data frame, and a size information of an SB; and wherein the one or more writing-back restriction conditions indicate a restricted delay of writing the coded data block to the global reference data block set.

7. The method according to claim 4, wherein the obtaining the global reference data block set comprises:

obtaining, based on a coding mode of the multimedia data frame being a serial coding mode, a first position information, a size information of an SB and a second position information, wherein the first position information being position information of a coded data block in the multimedia data frame, and the second position information being position information of the first data block in the multimedia data frame;

obtaining one or more writing-back restriction conditions, wherein the one or more writing-back restriction conditions indicate a restricted delay of writing the coded data block to the global reference data block set;

selecting, the coded data block having a parameter association relationship meeting the one or more writing-back restriction conditions and belonging to a same tile as the first data block from the multimedia data frame, as a first reference data block, wherein the parameter association relationship indicates a first association relationship between the first position information and the size information of the SB and a second association relationship between the first position information and the second position information; and adding the first reference data block to the global reference data block set.

8. The method according to claim 7, wherein the selecting the coded data block having the parameter association relationship as the first reference data block comprises:

selecting the coded data block belonging to a same tile as the first data block from the multimedia data frame as a first candidate reference data block based on the first position information and the second position information;

determining a restricted number of spaced data blocks between the coded data block and the first data block in the multimedia data frame under the one or more writing-back restriction conditions;

determining a number of spaced data blocks between the first candidate reference data block and the first data block based on the first position information, the size information of the SB and the second position information; and determining the first candidate reference data block with the number of spaced data blocks greater than the restricted number of spaced data blocks as the first reference data block.

9. The method according to claim 8, wherein the determining the number of spaced data blocks comprises:

determining a first row identifier and a first column identifier of the first candidate reference data block based on the first position information and the size information of the SB;

determining a second row identifier and a second column identifier of the first data block based on the second position information and the size information of the SB;

determining a number of data blocks in each row in the multimedia data frame based on a size information of the first data block; and determining the number of spaced data blocks between the first candidate reference data block and the first data block based on the number of data blocks in each row, the first row identifier, the first column identifier, the second row identifier, and the second column identifier.

10. The method according to claim 4, wherein the obtaining the global reference data block set comprises:
   obtaining a first position information, a size information of an SB and a second position information, wherein the first position information being position information of a coded data block in the multimedia data frame, and the second position information being position information of the first data block in the multimedia data frame;
   obtaining one or more writing-back restriction conditions and one or more coding processing conditions, wherein the one or more writing-back restriction conditions indicate a restricted delay of writing the coded data block to the global reference data block set;
   selecting the coded data block having a parameter association relationship meeting the one or more writing-back restriction conditions and the one or more coding processing conditions and belonging to a same tile as the first data block from the multimedia data frame as a second reference data block, wherein the parameter association relationship indicates a first association relationship between the first position information and a size information of the first data block and a second association relationship between the first position information and the second position information; and
   adding the second reference data block to the global reference data block set.

11. The method according to claim 10, wherein the selecting the coded data block having the parameter association relationship as the second reference data block comprises:
   selecting one or more coded data blocks belonging to a same tile from the multimedia data frame as first candidate reference data blocks based on the first position information and the second position information;
   selecting one or more candidate reference data blocks having a parameter association relationship meeting the one or more writing-back restriction conditions from the first candidate reference data blocks as second candidate reference data blocks;
   determining a first data block restriction distance between the coded data block and the first data block in the multimedia data frame based on the one or more writing-back restriction conditions;
   determining a second data block restriction distance between the coded data block and the first data block in the multimedia data frame based on the one or more coding processing conditions; and
   determining a second candidate reference data block meeting the one or more coding processing conditions from the second candidate reference data block as the second reference data block based on the first position information, the size information of the SB, the second position information, the first data block restriction distance, and the second data block restriction distance.

12. The method according to claim 11, wherein the determining the second candidate reference data block meeting the one or more coding processing conditions from the second candidate reference data blocks comprises:
   determining a third row identifier and a third column identifier of the second candidate reference data block based on the first position information and the size information of the SB;
   determining a fourth row identifier and a fourth column identifier of the first data block based on the second position information and the size information of the SB;
   selecting, from the second candidate reference data blocks as a third candidate reference data block, the second candidate reference data block with a row identifier not greater than the fourth row identifier of the first data block;
   determining a row distance between the third candidate reference data block and the first data block based on a fifth row identifier of the third candidate reference data block and the fourth row identifier;
   determining a column distance between the third candidate reference data block and the first data block based on a column identifier of the third candidate reference data block and the fourth column identifier; and
   determining the third candidate reference data block with the column distance less than a first distance threshold among one or more third candidate reference data blocks as the second reference data block, wherein the first distance threshold is determined based on the first data block restriction distance, the second data block restriction distance, and the row distance between the third candidate reference data block and the first data block.

13. The method according to claim 4, wherein the local reference data block set comprises at least one third reference data block, and the at least one third reference data block is a coded data block located in a same coding processing unit as the first data block in the multimedia data frame.

14. The method according to claim 4, wherein the local reference data block set comprises at least one fourth reference data block, and the at least one fourth reference data block is a coded data block adjacent to the first data block in the multimedia data frame and belonging to a same tile as the first data block.

15. The method according to claim 14, wherein the at least one fourth reference data block being adjacent to the first data block comprises the at least one fourth reference data block and the first data block belonging to a same SB.

16. The method according to claim 14, wherein the at least one fourth reference data block being adjacent to the first data block comprises the at least one fourth reference data block being located in a first number of SBs adjacent to the first data block, wherein a size of an SB is not greater than a size threshold, and wherein the first number of SBs is determined based on a size information of the SB.

17. The method according to claim 14, wherein the at least one fourth reference data block being adjacent to the first data block comprises the at least one fourth reference data block being located in a first number of SBs adjacent to the first data block, wherein a size of an SB is not less than a size threshold, wherein a first data block at an upper left corner of a target region is not reconstructed, wherein the target region is a region where the at least one fourth reference data block in the multimedia data frame moves to the right by one SB, and wherein position information when the at least one fourth reference data block moves by a distance of one SB is different from the position information of the first data block, and wherein the first number of SBs is based on a size information of the SB.

18. An apparatus for processing multimedia data, the apparatus comprising:
- at least one memory configured to store computer program code; and
- at least one processor configured to access the computer program code and operate as instructed by the computer program code, the computer program code including:
- first obtaining code configured to cause the at least one processor to obtain a global reference data block set and a local reference data block set, wherein the global reference data block set and the local reference data block set are associated with a first data block in a multimedia data frame, wherein the global reference data block set comprises a first coded data block being non-adjacent to the first data block, and wherein the local reference data block set comprises a second coded data block being adjacent to the first data block, wherein the global reference data block set and the local reference data block set are both adjacent to at least one non-reference data block set comprising at least one data block that is not referenceable by the first data block; and
- first determining code configured to cause the at least one processor to determine a reference data block for coding or decoding of the first data block based on the global reference data block set and the local reference data block set.

19. The apparatus of claim 18, further comprising:
second obtaining code configured to cause the at least one processor to obtain a coding mode of the first data block; and
second determining code configured to cause the at least one processor to determine, based on the coding mode of the first data block being an intra block copy (IBC) mode or an intra string copy (ISC) mode, the reference data block for coding or decoding of the first data block by using the global reference data block set and the local reference data block set.

20. A non-transitory computer-readable medium storing instructions, the instructions comprising: one or more instructions that, when executed by one or more processors of a device for processing multimedia data, cause the one or more processors to:
- obtain a global reference data block set and a local reference data block set, wherein the global reference data block set and the local reference data block set are associated with a first data block in a multimedia data frame, wherein the global reference data block set comprises a first coded data block being non-adjacent to the first data block, and wherein the local reference data block set comprises a second coded data block being adjacent to the first data block, wherein the global reference data block set and the local reference data block set are both adjacent to at least one non-reference data block set comprising at least one data block that is not referenceable by the first data block; and
- determine a reference data block for coding or decoding of the first data block based on the global reference data block set and the local reference data block set.

* * * * *